US008635097B2

(12) United States Patent
Uchida

(10) Patent No.: US 8,635,097 B2
(45) Date of Patent: Jan. 21, 2014

(54) SCHEDULE WARNING SYSTEM, SCHEDULE WARNING METHOD AND MEDIUM STORING SCHEDULE WARNING PROGRAM

(75) Inventor: Goh Uchida, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1495 days.

(21) Appl. No.: 11/927,205

(22) Filed: Oct. 29, 2007

(65) Prior Publication Data

US 2008/0238664 A1  Oct. 2, 2008

(30) Foreign Application Priority Data

Mar. 30, 2007  (JP) .................................. 2007-091756

(51) Int. Cl.
*G06Q 10/00*  (2012.01)

(52) U.S. Cl.
USPC ........ 705/7.15; 705/7.13; 705/320; 705/7.11; 705/348; 705/32

(58) Field of Classification Search
USPC ........................................................ 705/7.15
See application file for complete search history.

(56) References Cited

U.S. PATENT DOCUMENTS

2004/0002885 A1* 1/2004 Levy ................................. 705/8
2004/0153354 A1* 8/2004 Nonaka et al. .................... 705/8
2007/0239871 A1* 10/2007 Kaskie .......................... 709/224

FOREIGN PATENT DOCUMENTS

| JP | 2001-117969 A | | 4/2001 | |
| JP | 2004/185347 | * | 7/2004 | ............ G06Q 10/00 |
| JP | 2004-185347 A | | 7/2004 | |
| JP | 2004-240486 A | | 8/2004 | |

* cited by examiner

*Primary Examiner* — James A Reagan
(74) *Attorney, Agent, or Firm* — Sughrue Mion, PLLC

(57) ABSTRACT

A schedule warning system includes a schedule managing unit that manages schedule information for at least one task item, a relating person data managing unit that manages relating person data that relates to the schedule information, a defining unit that defines a delay monitoring condition to monitor a schedule delay and a warning recipient calculation condition to determine a warning recipient, based on the task item of the schedule information, a delay monitoring unit that monitors whether a schedule delay occurs in corresponding task item, based on the delay monitoring condition, a warning recipient calculating unit that identifies a relating person who corresponds to the task item from the relating person data based on the warning recipient calculation condition and calculates a warning recipient, when a schedule delay occurs, and a warning execution unit that transmits a warning based on the warning recipient calculated by the warning recipient calculating unit.

21 Claims, 34 Drawing Sheets

| Project name | Schedule table name | task item | task plan | Actual task performance | Warning recipient calculation condition ID | Delay monitoring condition ID | Delay information ID | Warning history ID | Warning pre-transmission confirmation defining ID | Warning recipient advance information ID | Warning recipient advance information use ID | Warning recipient list ID | Warning message ID | Warning transmitting manager ID |
|---|---|---|---|---|---|---|---|---|---|---|---|---|---|---|
| Customer software development-project 1 | Customer software development-project 1 schedule | Design A | 20060320-20060330 | 20060320-20060405 | Recipient-Calculation-Condition-ID-001 | Delay-Monitoring-Condition-ID-001 | Delay-Info-ID-001 | Warning-Message-History-ID-001 | | | | Recipient-List-ID-001 | Warning-Message-ID-001 | Mm101 |
| … | | | | | | | | | | | | | | … |

(2)

| Project name | Schedule table name | task item | task plan | Actual task performance | Warning recipient calculation condition ID | Delay monitoring condition ID | Delay information ID | Warning history ID | Warning pre-transmission confirmation defining ID | Warning recipient advance information ID | Warning recipient advance information use ID | Warning recipient list ID | Warning message ID | Warning transmitting manager ID |
|---|---|---|---|---|---|---|---|---|---|---|---|---|---|---|
| Customer software development-project 1 | Customer software development-project 1 schedule | Design A | 20060320-20060330 | 20060320-20060405 | Recipient-Calculation-Condition-ID-001 | Delay-Monitoring-Condition-ID-001 | Delay-Info-ID-001 | Warning-Message-History-ID-001 | Warning-confirmation-Setting-ID-001 | | | Recipient-List-ID-001 | Warning-Message-ID-001 | Mm101 |
| … | | | | | | | | | | | | | | … |

(3)

| Project name | Schedule table name | task item | task plan | Actual task performance | Warning recipient calculation condition ID | Delay monitoring condition ID | Delay information ID | Warning history ID | Warning pre-transmission confirmation defining ID | Warning recipient advance information ID | Warning recipient advance information use ID | Warning recipient list ID | Warning message ID | Warning transmitting manager ID |
|---|---|---|---|---|---|---|---|---|---|---|---|---|---|---|
| Customer software development-project 1 | Customer software development-project 1 schedule | Design A | 20060320-20060330 | 20060320-20060405 | Recipient-Calculation-Condition-ID-001 | Delay-Monitoring-Condition-ID-001 | Delay-Info-ID-001 | Warning-Message-History-ID-001 | Warning-confirmation-Setting-ID-001 | Recipient-Pre-Setting-ID-001 | Recipient-Pre-Setting-Use-ID-001 | Recipient-List-ID-001 | Warning-Message-ID-001 | Mm101 |
| … | | | | | | | | | | | | | | … |

FIG. 4A

|  |  |
|---:|:---|
| Project name | Customer software development-project 1 |
| Schedule table name | Customer software development-project 1 schedule |
| Task item | Design A |
| Task plan | March 20 to 30 |

☑ Calculate all relating persons assigned to the task item — 700, 702

☐ Designate from among the relating persons assigned to the task item
 ☐ All execution managers
 ☐ A portion of execution managers
  ☐ Mm101
 ☐ All communication managers
 ☐ A portion of communication managers
  ☐ Accountability advisor
  ☐ Consulting advisor
  ☐ Disclosure advisor
 ☐ All management managers
 ☐ A portion of management managers
  ☐ Scope  ☐ Time  ☐ Cost
  ☐ Quality  ☐ Human resources  ☐ Communication
  ☐ Risk  ☐ Logistics  ☐ Integration — 704

☐ Calculate all coworkers and supervisor if the relating person assigned to the task item — 706

☑ Designate from among coworkers and supervisors of the relating persons assigned to the task item
 ☑ Supervisor of the project
 ☐ Coworker of the project
 ☑ Supervisor of the functional organization
 ☐ Coworker of the functional organization — 708

[Define]

FIG. 4B

| Warning recipient calculation condition ID | All relating persons assigned to the task item | A portion of the relating persons assigned to the task item | All coworkers and supervisors of the relating person | A portion of coworkers and supervisors of the relating person |
|---|---|---|---|---|
| Recipient-Calculation-Condition-ID-001 | TRUE; | — | FALSE; | Project-Upper-Manager: TRUE; Project-Member: FALSE; Functional-Organization-Upper-Manager: TRUE; Functional-Organization-Member: FALSE; |
| ... | ... | ... | ... | ... |

| Delay monitoring condition ID | Delay advance notice | Delay judgment condition | Date and time the conditions defined |
|---|---|---|---|
| Delay-Monitoring-Condition-ID-001 | Receive | 3days:00hours:00minutes | 20060121-12:56 |
| ... | ... | ... | ... |

FIG. 6A

| | |
|---|---|
| Definition of storage of warning history | _ □ X |

| | |
|---|---|
| Project name | Customer software development-project 1 |
| Schedule table name | Customer software development-project 1 schedule |
| Task item | Design A |
| Task plan | March 20 to 30 |

| | |
|---|---|
| Store history of warning transmission? | ☑Yes ☐No |

[Define]

| Warning history ID | Storage | Warning message ID | Transmission date and time (yyyymmddhhmm) |
|---|---|---|---|
| Warning-Message-History-ID-001 | TRUE | Warning-Message-ID-001 | 20060405:19:21 |
| ... | ... | ... | ... |

FIG. 6C

| | Browsing of warning history | _ □ X |
|---|---|---|

| Project name | Customer software development-project 1 |
|---|---|
| Schedule table name | Customer software development-project 1 schedule |
| Task item | Design A |
| Task plan | March 20 to 30 |

| Warning transmission date and time | Recipient | Content of the message | Details |
|---|---|---|---|
| 20060405: 19:21 | Mm101; Mm106; PM001; PM002; PM 003; GM001; PGL001; | To whom concerned in project A, | Detail |
| | | Planed duration of the task item, project A, in the project, Customer software development- project 1, was from March 10 to 20. However, as of March 23, the project is 3 days behind schedule. Please consider appropriate actions. | |

Return

FIG. 7

| Delay information ID | Delay monitoring condition ID | Presence or absence of delay advance notice | A delay occurs? | Date and time the delay occurs |
|---|---|---|---|---|
| Delay-Info-ID-001 | Delay-Monitoring-Condition-ID-001 | Absent | Yes | 20060403-00:00 |

FIG. 8A
Task item responsibility-sharing information

| Project name | Task item | Execution managers | Communication managers | | | Management managers | | | | | | | | |
|---|---|---|---|---|---|---|---|---|---|---|---|---|---|---|
| | | | Accountability advisor | Consulting advisor | Disclosure advisor | Integration | Scope | Time | Cost | Quality | Human resources | Communication | Risk | Logistics |
| Customer software development project 1 | Design A | Mm101 | Mm101 | Mm106 | PM001 | PM003 | PM001 | PM001 | PM001 | PM002 | PM003 | PM001 | PM003 | PM003 |
| Customer software development project 1 | Design B | Mm202 | Mm202 | Mm205 | PM001 | Mm202 | Mm202 | Mm202 | Mm202 | Mm202 | Mm202 | Mm202 | Mm202 | Mm202 |
| Customer software development project 1 | Design C | Mm303 | Mm303 | Mm304 | Mm303 | PM003 | Mm303 | Mm303 | Mm303 | Mm303 | | PM001 | PM003 | PM003 |
| Customer software development project 1 | Implementation D | Mm101 | Mm101 | Mm106 | PM001 | PM003 | PM001 | PM001 | PM001 | PM002 | PM003 | PM001 | PM003 | PM003 |
| Customer software development project 1 | Implementation E | Mm202 Mm303 | Mm202 | Mm202 | Mm202, Mm303 | Mm202, Mm303 | Mm202, Mm303 | Mm202, Mm303 | Mm202, Mm303 | Mm202, Mm303 | Mm202, Mm303 | Mm202, Mm303 | Mm202, Mm303 | Mm202, Mm303 |
| ... | ... | ... | ... | ... | ... | ... | ... | ... | ... | ... | ... | ... | ... | ... |

FIG. 8B  Functional organization information

| Section name | Section leader ID | Group name | Group leader ID | Group member ID |
|---|---|---|---|---|
| Product software first development section | DM001 | UI product development group | GM001 | Mm101, Mm102, Mm103, Mm104, Mm105, Mm106 |
| Product software first development section | DM001 | Web application product development group | GM002 | Mm201, Mm202, Mm203, Mm204, Mm205, Mm206 |
| Product software first development section | DM001 | Mobile product development group | GM003 | Mm301, Mm302, Mm303, Mm304, Mm305, Mm306 |
| ... | ... | ... | ... | ... |

FIG. 8C  Project organization information

| Program name | Program manager ID | Project name | Project leader ID | Project member ID |
|---|---|---|---|---|
| Customer software development program | PGL001 | Customer software development - project 1 | PM001 | Mm101, Mm202, Mm303 |
| Customer software development program | PGL001 | Customer software development - project 2 | PM002 | Mm104, Mm205, Mm306 |
| ... | ... | ... | ... | ... |
| Customer software development program | PGL001 | Project management team | PGL001 | PJL001, PJL002, PJL003, PJL004, Mm202 |
| ... | ... | ... | ... | ... |

FIG. 8D  Member information database

| Member ID | Member name | Telephone number | Fax number | E-mail address | Location | ... |
|---|---|---|---|---|---|---|
| Mm101 | Akashi | 9—00—9984 | ... | ... | ... | ... |
| Mm102 | Kamata | 9—00—9151 | ... | ... | ... | ... |
| Mm103 | Sasaki | 9—11—7131 | ... | ... | Iwate | ... |
| ... | ... | ... | ... | ... | ... | ... |

FIG. 8E

| | | Browse |
|---|---|---|
| Section name | Customer software development section | ☐ |
| Section manager | Tanaka[DM001] | ☐ |
| Group name | UI product development group | ☐ |
| Group leader | Yamamoto[GM001] | ☑ |
| Group member | Akaishi[Mm101]; Akita[Mm102]; Iwata[Mm103]; Egawa[Mm104]; Okada[Mm105]; Ohshima[Mm106] | ☐ |

Input of functional organization information

[Enter] [Browse database]

FIG. 8F

Browse member information database _ ☐ ×

Member list

Akashi[Mm101], 9-00-9984
Kamata[Mm102], 9-00-9151
Sasaki[Mm103], 9-11-7131

[Previous page] [Next page]

Select from the list and press input button.

[Input]

FIG. 8G

| | Input of project organization information | _ □ × |
|---|---|---|

| | | Browse |
|---|---|---|
| Program name | Customer software development program | ☐ |
| Programming manager | Taguchi[PGL001] | ☑ |
| Project name | Customer software development - project 1 | ☐ |
| Project leader | Yaguchi[PM001] | ☐ |
| Project member | Akaishi[Mm101]; Kamata[Mm202]; Sasaki[Mm303]; | ☐ |

[Enter]   [Browse database]

FIG. 8H

Input of communication and management manager information   _ □ ×

Project name: Customer software development- project 1
Task item: Design A

| | | Browse |
|---|---|---|
| Execution manager | Akashi[Mm101] | ☐ |

Communication managers

| | | |
|---|---|---|
| Accountability advisor | Akashi[Mm101] | ☐ |
| Consulting advisor | Ohshima[Mm106] | ☐ |
| Disclosure advisor | Yaguchi[PM001] | ☐ |

Management managers

| | | |
|---|---|---|
| Integration | Satoh[PM003] | ☐ |
| Scope | Yaguchi[PM001] | ☐ |
| Time | Yaguchi[PM001] | ☐ |
| Cost | Yaguchi[PM001] | ☐ |
| Quality | Yamada[PM002] | ☐ |
| Human resources | Satoh[PM003] | ☐ |
| Communication | Yaguchi[PM001] | ☐ |
| Risk | Satoh[PM003] | ☐ |
| Logistics | Satoh[PM003] | ☐ |

[Enter]   [Browse database]

FIG. 8K

| Relating person information defining menu     _ ☐ ✕ |
|---|
| Input functional organization information(O)<br>Input project organization information(P)<br>Input communication and management manager information(C)<br>Input member information(M) |

FIG. 10

| Warning recipient list ID | Warning recipient list |
|---|---|
| Recipent-list-ID-001 | Mm101; Mm106; PM001; PM002; PM003; GM001; PGL001; |
| ... | ... |

FIG. 11

| Warning message ID | Warning recipient list ID | Warning transmission manager ID | Content of the warning message |
|---|---|---|---|
| Warning-Message-ID-001 | Recipient-list-ID-001 | Mm001 | To: Whom concerned in project A, Planed duration of the task item, project A, in the project, Customer software development – project 1, was from March 10 to 20. However, as of March 23, the project is 3 days behind schedule. Please consider appropriate actions. |
| ... | ... | ... | ... |

FIG. 13A

| | |
|---|---|
| Definition of confirmation immediately before transmitting warning | _ ☐ ✕ |

| | |
|---|---|
| Project name | Customer software development – project 1 |
| Schedule table name | Customer software development – project 1 schedule |
| Task item | Design A |
| Task plan | From March 10 to 20 |

| | |
|---|---|
| Confirm with transmission manager immediately before transmitting a warning ? | ☑Yes ☐No |

[Define]  ~740

FIG. 13B

| Warning pre-transmission confirmation defining ID | Warning pre-transmission confirmation | Warning pre-transmission confirmation message ID |
|---|---|---|
| Warning-Confirmation-Setting-ID-001 | TRUE | — |
| ... | ... | ... |

FIG. 14

| Warning pre-transmission confirmation message ID | Warning recipient list ID | Warning transmission manager ID | Content of warning pre-transmission confirmation message |
|---|---|---|---|
| Warning-Confrimation-Message-ID-001 | Recipient-list-ID-001 | Mm001 | To: warning message defining manager<br><br>Warning message will be trasmitted to the following recipients. Please confirm the recipients and inform us whether or not the transmission is to be done.<br>Mm101;<br>Mm106;<br>PM001;<br>PM002;<br>PM003;<br>GM001;<br>PGL001;<br>Confirmation URL:<br>http://www.recipient.co.jp/ |
| ... | ... | ... | ... |

FIG. 15

| | Confirmation of warning recipients immediately before transmission | _ □ × |
|---|---|---|
| | Please confirm whether transmission of warning is to be done. | |

| Recipients | Confirm transmission | Detailed information of recipient |
|---|---|---|
| Mm101; | ☑ | Browse |
| Mm106; | ☑ | Browse |
| PM001; | ☑ | Browse |
| PM002; | ☑ | Browse |
| PM003; | ☑ | Browse |
| GM001 | ☐ | Browse |
| PGL001 | ☐ | Browse |

[ Enter ]

FIG. 16

| Warning recipient list ID | Warning recipient list (with the information of send or not-send) |
|---|---|
| Recipent-list-ID-001 | Mm101:Send; |
| | Mm106:Send; |
| | PM001:Send; |
| | PM002:Send; |
| | PM003:Send; |
| | GM001:Not-Send; |
| | PGL001:Not-Send; |
| ... | ... |

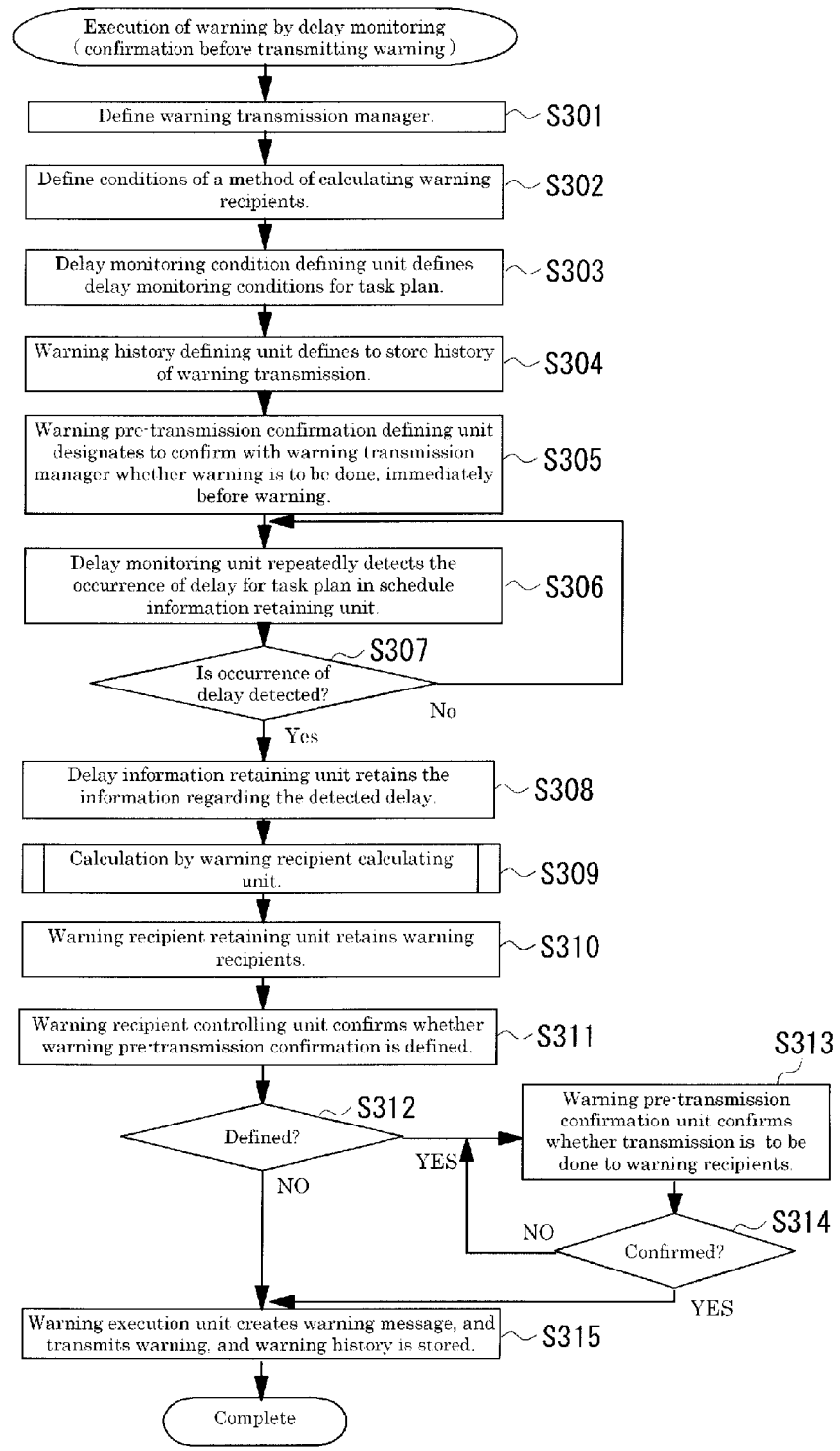

FIG. 18A

| | |
|---|---|
| Creation of warning recipient advance information | _ □ × |

| | |
|---|---|
| Project name | Customer software development – project 1 |
| Schedule table name | Customer software development – project 1 schedule |
| Task item | Design A |
| Task plan | From March 10 to 20 |

| | | |
|---|---|---|
| Create warning advance information? | ☑Yes | ☐No |

[Start]

| Warning recipient advance information ID | Warning recipient advance information status |
|---|---|
| Recipient-Pre-Setting-ID-001 | Start creation |
| ... | ... |
| | |

FIG. 19B

| Warning recipient advance information ID | Warning recipient list ID | Warning recipient list ( with control information ) |
|---|---|---|
| Recipient-Pre-Setting-ID-001 | Recipent-list-ID-002 | Mm101:;<br>Mm106:;<br>PM001:;<br>PM002:;<br>PM003:;<br>GM001::<br>PGL001:; |
|  | ... | ... |

FIG. 20A

| Definition of warning recipient control information | _ □ × |
|---|---|

| Warning recipient | Control information |
|---|---|
| Mm101 | Immediately transmit |
| Mm106 | Immediately transmit |
| PM001 | Immediately transmit |
| PM002 | Immediately transmit |
| PM003 | Hold transmission |
| GM001 | Hold transmission |
| PGL002 | Hold transmission |

[Define]

FIG. 20B

| Control information menu _ □ × |
|---|
| ✓ Immediately transmit<br>Hold transmission<br>Specify transmission date |

FIG. 20C

| Warning recipient advance information ID | Warning recipient list ID | Warning recipient list ( with control information ) |
|---|---|---|
| Recipient-Pre-Setting-ID-001 | Recipent-list-ID-002 | Mm101: Immediately transmit;<br>Mm106: Immediately transmit;<br>PM001: Immediately transmit;<br>PM002: Immediately transmit;<br>PM003: Immediately transmit;<br>GM001: Hold tramission;<br>PGL001: Hold transmission; |
|  | ... | ... |

| Warning recipient advance information use ID | Use advance information |
|---|---|
| Recipient-Pre-Setting-Usage-ID-001 | TRUE |
| ... | ... |

FIG. 23

| Warning message ID | Warning recipient advance information ID | Warning transmission manager ID | Message |
|---|---|---|---|
| Warning-Message-ID-001 | Recipient-Pre-Setting-ID-001 | Mm001 | To: Whom concerned in project A<br><br>Planed duration of the task item, project A, in March in the project was from March 10 to 20. However, as of March 23, the project is 3 days behind schedule. Please consider appropriate actions. |
| ... | ... | ... | ... |

FIG. 25A

| | |
|---:|:---|
| Project name | Customer software development-project 1 |
| Schedule table name | Customer software development-project 1 schedule |
| Task item | Design A |
| Task plan | From March 10 to 20 |

Define of conditions of calculating warning recipient

Define if calculating conditions 770

| | Project | | Functional organization | |
|---|---|---|---|---|
| | Supervisor | Coworker | Supervisor | Coworker |
| ☐All of execution managers of the task item | | | | |
| ☐All of autonomous members of the task item | | | | |
| ☑A portion of autonomous members of the task item | | | | |
| ☑Autonomous members for communication responsibility | × | | × | |
| ☐Autonomous members for management responsibility | | | | |
| ☐All of support members of the task item | | | | |
| ☑A portion of support members of the task item | | | | |
| ☐Support members for communication responsibility | | | | |
| ☑Trainer members for communication responsibility | | | | |
| ☐Support members for management responsibility | | | | |
| ☐Trainer members for management responsibility | | | | |

[Define]

FIG. 25B

Search supervisor or coworker

☐Supervisor of the project

☐Coworker of the project

☐Supervisor of the functional organization

☐Coworker of the functional organization

☐Do not designate

FIG. 25C

| Warning recipient cauculation condition ID | All execution managers of the task item | All autonomous members of the task item | A portion of autonomous members of the task item | All support members of the task item | A portion of support members of the task item |
|---|---|---|---|---|---|
| Recipient-Calculation-Condition-ID-002 | Activity-Resp-Member: FALSE; | All-Autonomous-Member: FALSE; | Not-All-Autonomous-Member:TRUE; Comm-Resp-Auto-Member:TRUE [Project-Upper-Manager:TRUE, Project-Member:FALSE, Functional-Organization-Upper-Manager:TRUE, Functional-Organization-Member:FALSE]; Management-Resp-Auto-Member: FALSE; | All-Support-Member:FASLE; | Not-All-Support-Member:TRUE; Comm-Resp-Supporter: FASLE; Comm-Resp-Advisor: TRUE; Management-Resp-Supporter: FALSE; Management-Resp-Advisor: FALSE; |
| ... | ... | ... | ... | ... | ... |

SCHEDULE WARNING SYSTEM, SCHEDULE WARNING METHOD AND MEDIUM STORING SCHEDULE WARNING PROGRAM

CROSS-REFERENCE TO RELATED APPLICATIONS

This application is based on and claims priority under 35 USC 119 from Japanese Patent Application No. 2007-091756 filed Mar. 30, 2007.

BACKGROUND

1. Technical Field

The present invention relates to a schedule warning system, a schedule warning method and a medium storing a schedule warning program, which are communicated via a network, and more specifically relates to a technique for transmitting a warning to relating persons when a schedule delay occurs.

2. Related Art

In a situation where locations of members of a group who work for a task are dispersed, a system is generally used that manages a work schedule by using a communication system such as a computer system on the Internet or a telephone.

In a case where a warning regarding a schedule delay of an operation or a task is to be communicated to its relating persons, a schedule warning system may be used in which a warning message may be displayed on a computer display of the relating persons who are previously defined, or a warning message may be transmitted as an e-mail. In addition, there is a system that uses dependencies between operations or tasks to identify a relating operation or task, and identifies relating persons who correspond to the relating operation or task, and informs the relating persons of a warning.

In a case where a task manager is assigned to a task and there are relating persons in an organization to which the task manager belongs, a communication may be made in which the task manager and the relating persons are informed of a warning when a schedule delay of the task occurs. In the communication, it is an important object that the following properties are achieved concurrently.

(1) There should be no loss in warning recipients to be informed.

(2) There is no need to inform an unnecessary recipient of a warning.

(3) There should be no delay in informing of a warning, or the warning should not be informed at an inappropriate timing.

In the related arts, however, a warning of a schedule delay is simply displayed on a display. Therefore, relating persons need to periodically check the presence or absence of a delay on the display. Therefore, there may be a loss in informing of a warning because it is not certain that all of the relating persons check it on their display. In addition, there is no restriction in browsing the display, and thus an unrelated person may know about the warning. Moreover, the relating persons who need to be informed of the warning do not always browse the display immediately after a delay occurs. Therefore, there may be a delay in informing of the warning.

(1) In a case where plural persons are assigned as the persons relating to a certain task, it may sometimes be better that warning recipients are informed of a warning depending on role responsibility of each of the relating persons. In the related arts, the persons relating to a task are not plural persons who are assigned depending on their role responsibilities. In the related arts, in a case where plural persons relating to a certain task are assigned depending on their role responsibilities, there is a problem in that a warning is not transmitted to the plural persons who have the responsibilities. Therefore, the person in charge of transmitting the warning has to identify the relating persons through human judgments depending on each role responsibility from some other information source, and define them as warning recipients. This often results in a loss in warning recipients, or a warning transmitted to an unrelated person. In addition, the operation for the judgments and identification requires efforts and time, which leads to a delay of the warning.

(2) A person relating to a certain task belongs to a functional organization or a project organization. It may sometimes be better that supervisors or coworkers of the person are also informed of a warning as long as they hold responsibilities for the task. In the related arts, it is impossible to transmit a warning from a relating person assigned to a task to the supervisors or coworkers of the organization the relating person belongs to. Therefore, the person in charge of transmitting the warning has to review the information of the functional organization or project organization of the person assigned to the task, and find out supervisors or coworkers through manpower and judgments, and define them as warning recipients. This often results in a loss in warning recipients, or a warning transmitted to an unrelated person. In addition, the operation for finding out warning recipients requires efforts and time, which leads to a delay of the warning. Especially "in a case where plural persons are assigned as the persons relating to a certain task," as described in (1), this problem becomes worse.

(3) In the related arts, warning recipients are simply automatically calculated as relating persons assigned to the task and a warning is automatically transmitted to them, and thus there is a problem in that it is impossible to transmit a warning to a warning recipient depending on each situation. For example, a confirmation by the person in charge of transmitting the warning, or designation whether or not to transmit the warning cannot be made. This often results in a loss in warning recipients, or a warning transmitted to an unrelated person. In addition, the operation for transmitting a warning to intended warning recipients requires efforts and time, which leads to a delay of the warning. (There are an example that a confirmation of warning recipients and whether or not to transmit a warning can be defined before a delay occurs, and an example that they can be defined after the occurrence of the delay and before the transmission of the warning). Especially "in a case where plural persons are assigned as the persons relating to a certain task," as described in (1), this problem becomes worse.

(4) In the related arts, there is a problem in that it is impossible to define the criterion of a schedule delay for each operation or each task. Therefore, the timing of transmitting a warning may be inappropriate, for example, because the judging criterion of a delay is too early or too late.

(5) In the related arts, there is a problem in that the system cannot support the case where an advance notice of a schedule delay is previously given by a relating person. Therefore, even though an advance notice of a delay is previously given, the timing of informing of a warning is inappropriate such that the warning is not transmitted until the delay occurs.

SUMMARY

An aspect of the invention provides a schedule warning system that includes a schedule managing unit that manages schedule information for at least one task item; a relating person data managing unit that manages relating person data that relates to the schedule information; a defining unit that defines a delay monitoring condition to monitor a schedule delay and defines a warning recipient calculation condition to determine a warning recipient, based on the task item of the schedule information; a delay monitoring unit that monitors whether or not a schedule delay occurs in corresponding task item, based on the delay monitoring condition; a warning recipient calculating unit that identifies a relating person who corresponds to the task item from the relating person data based on the warning recipient calculation condition and calculates a warning recipient, when a schedule delay occurs; and a warning execution unit that transmits a warning based on the warning recipient calculated by the warning recipient calculating unit.

According to an aspect of the invention, warning recipients can be calculated from the data that shows a task manager who relates to a schedule delay of a task or a correlation between relating persons in an organization to which the task manager belongs, and whether or not to transmit a warning can be controlled in response to a confirmation or determination of the person in charge of transmitting the warning, and a criterion of a schedule delay can be defined for each task, and an advance notice of a schedule delay can be can supported, and a warning transmission history can be retained and browsed, thereby a warning of a schedule delay is transmitted. Therefore, the quality of the communication of a warning of a schedule delay can be improved.

BRIEF DESCRIPTION OF THE DRAWINGS

Exemplary embodiments of the present invention will be described in detail based on the following figures, wherein:

FIG. 3C (1), (2), and (3) are diagrams showing data structures of schedule information;

FIG. 4A is an example of a display for defining warning recipient calculation conditions;

FIG. 4B is a diagram showing a data structure of warning recipient calculation conditions;

FIG. 6A is an example of a display for defining storage of warning history;

FIG. 6B is a diagram showing a data structure of a transmission history of a warning message;

FIG. 6C is an example of a display for browsing a warning history;

FIG. 7 is a diagram showing a data structure of delay information;

FIG. 8A is a diagram showing a data structure of task item responsibility-sharing information;

FIG. 8B is a diagram showing a data structure of functional organization information;

FIG. 8C is a diagram showing a data structure of project organization information;

FIG. 8D is a diagram showing a data structure of a member information database;

FIG. 8E is a diagram showing an example of a display for inputting functional organization information;

FIG. 8F is a diagram showing an example of a display for viewing a member information database;

FIG. 8G is a diagram showing an example of a display for inputting project organization information;

FIG. 8H is a diagram showing an example of a display for inputting information of communication and management managers;

FIG. 8K is a display example showing a menu for defining relating person information;

FIG. 10 is a diagram showing a data structure of a warning recipient list;

FIG. 11 is a diagram showing a data structure of a delay message;

FIG. 13A is an example of a display for defining a confirmation before transmitting a warning;

FIG. 13B is a diagram showing a data structure of a confirmation definition before transmitting a warning;

FIG. 14 is a diagram showing a data structure of content of a confirmation mail;

FIG. 15 is an example of a display for defining a confirmation of warning recipients;

FIG. 16 is a diagram showing a data structure of a warning recipient list with the information whether the warning is to be transmitted or not;

FIG. 17 is a flowchart for illustrating an operation for transmitting a warning by a schedule warning system according to a second exemplary embodiment;

FIG. 18A is an example of a display for defining warning recipient advance information;

FIG. 18B is a diagram showing a data structure of warning recipient advance information;

FIG. 19B is a diagram showing a data structure of a warning recipient list with control information;

FIG. 20A is an example of a display for defining control information of warning recipients;

FIG. 20B is an example of a display of a menu of control information;

FIG. 20C is a diagram showing a data structure of warning recipient advance information;

FIG. 23 is a diagram showing a data structure of a warning message;

FIG. 25A is an example of a display for defining conditions of calculating warning recipients;

FIG. 25B shows an example of a display of a menu of search designation;

FIG. 25C is a diagram showing a data structure of warning recipient calculation conditions.

DETAILED DESCRIPTION

Referring to the accompanying drawings, exemplary embodiments for implementing the present invention will be now described.

Figure 1:
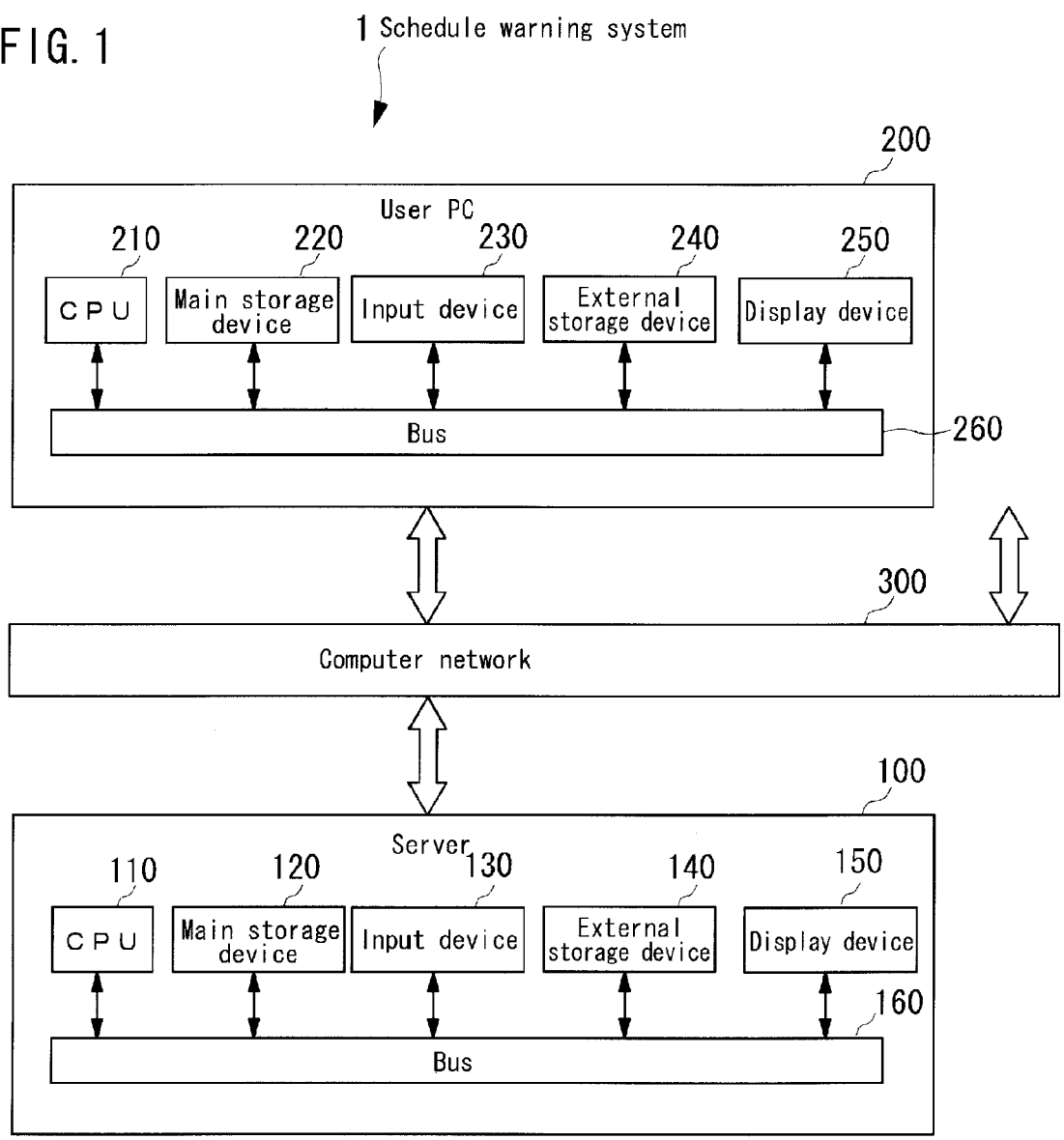
FIG. 1 is a block diagram showing a configuration of a schedule warning system according to an exemplary embodiment of the present invention.

FIG. 1 shows a configuration example of a schedule warning system according to an exemplary embodiment. As shown in FIG. 1, a schedule warning system 1 includes a server 100, a user PC 200, and a computer network 300 that connects the server 100 and the user PC 200. In FIG. 1, one typical user PC is shown as the user PC 200, however, besides the PC, plural user PCs may be connected. In the schedule warning system 1, the server 100 has a function of storing information regarding schedule information that includes an input or a change or the like from the user PC 200, and executing a warning of a schedule delay via the computer network 300 to the user PC 200 based on the stored information.

The server 100 includes a CPU 110, a main storage device 120, an input device 130, an external storage device 140, and a display device 150, which are mutually connected via a bus 160. The external storage device 140 preferably uses a mass storage device such as a hard disk or the like, and constructs such a database that stores information regarding a schedule or a warning inputted from the user PC 200 as described later. In addition, the external storage device 140 may store various programs, and the CPU 110 may perform operations depending on these programs.

The user PC 200 includes a CPU 210, a main storage device 220, an input device 230, an external storage device 240, and a display device 250, which are mutually connected via a bus 260. The external storage device 240 may store data or store a program from the server 100. The CPU 210 controls each of these devices depending on the program.

Each of the server 100 and the user PC 200 has a communication function, and performs transmission and reception of information each other via the computer network 300. The computer network 300 may be the Internet or a LAN, for example.

Figure 2:
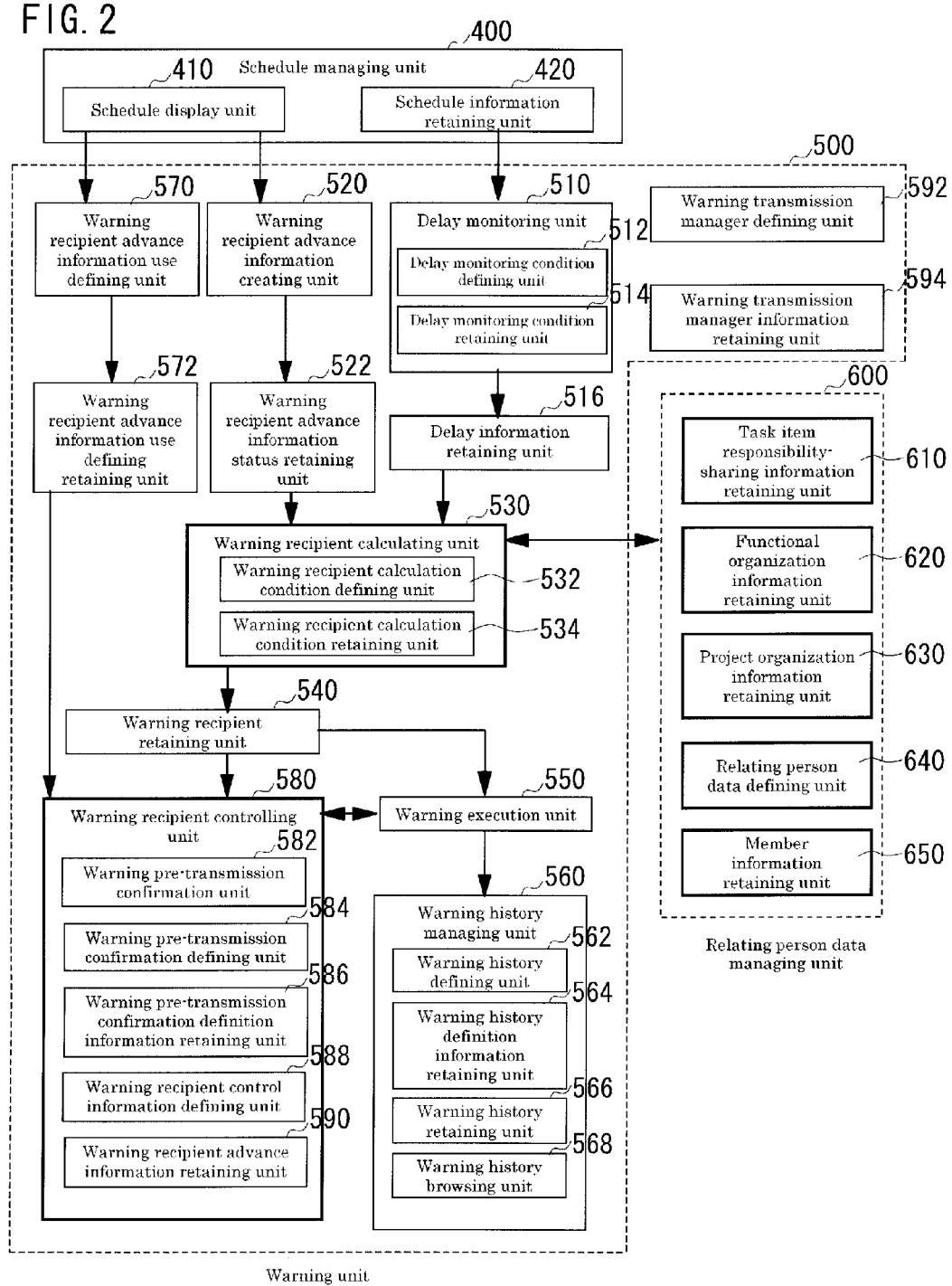
FIG. 2 is a block diagram showing a functional construction of a schedule warning system according to an exemplary embodiment.

FIG. 2 is a block diagram showing a functional construction of a schedule warning system according to an exemplary embodiment. As shown in FIG. 2, a schedule warning system 1 includes three basic functions; a schedule managing unit 400, a warning unit 500, and a relating person data managing unit 600.

The schedule managing unit 400 includes a schedule display unit 410 for displaying schedule information and a schedule information retaining unit 420 for retaining the schedule information.

The warning unit 500 includes a delay monitoring unit 510 for monitoring a schedule delay, a delay information retaining unit 516 for retaining detected delay information, a warning recipient advance information creating unit 520 for creating warning recipient advance information, a warning recipient advance information status retaining unit 522 for retaining a warning recipient advance information status, a warning recipient calculating unit 530 for calculating a warning recipient, a warning recipient retaining unit 540 for retaining a calculated warning recipient, a warning execution unit 550 for executing a warning to the retained warning recipient, a warning history managing unit 560 for managing history information of an executed warning, a warning recipient advance information use defining unit 570 for defining to use the warning recipient advance information, a warning recipient advance information use definition retaining unit 572 for retaining a warning recipient advance information use definition, a warning recipient controlling unit 580 for controlling a calculated warning recipient based on the warning recipient advance information use definition, a warning transmission manager defining unit 592 for defining a warning transmission manager, and a warning transmission manager information retaining unit 594 for retaining defined warning transmission manager information.

The delay monitoring unit 510 includes a delay monitoring condition defining unit 512 and a delay monitoring condition retaining unit 514. The warning recipient calculating unit 530 includes a warning recipient calculation condition defining unit 532 and a warning recipient calculation condition retaining unit 534. The warning history managing unit 560 includes a warning history defining unit 562, a warning history definition information retaining unit 564, a warning history retaining unit 566, and a warning history browsing unit 568. The warning recipient controlling unit 580 includes a warning pre-transmission confirmation unit 582, a warning pre-transmission confirmation defining unit 584, a warning pre-transmission confirmation definition information retaining unit 586, a warning recipient control information defining unit 588, and a warning recipient advance information retaining unit 590.

The relating person data managing unit 600 includes a task item responsibility-sharing information retaining unit 610, a functional organization information retaining unit 620, a project organization information retaining unit 630, a relating person data defining unit 640, and a member information retaining unit 650.

Figure 3A:
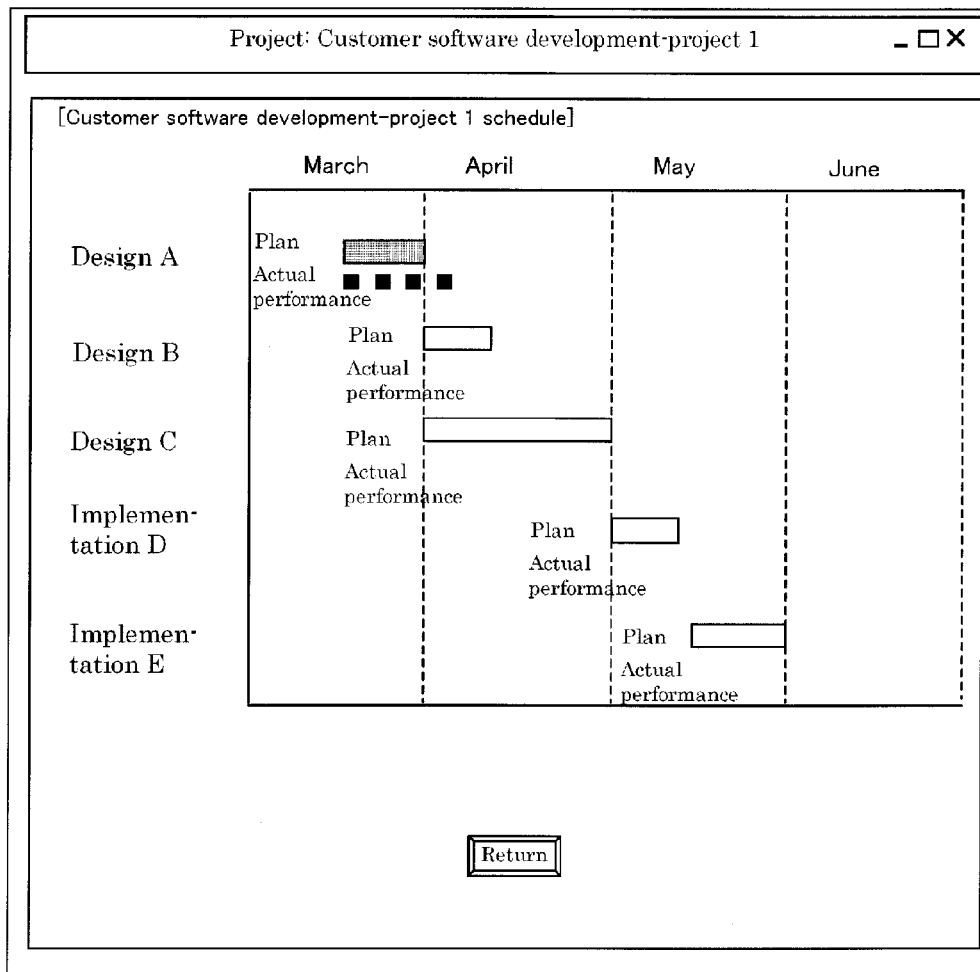
FIG. 3A is an example of display showing schedule information.

FIG. 3A is an example of display showing schedule information, as an example of the schedule managing unit 400. The schedule information is displayed by the schedule display unit 410 for a user. For example, the schedule information shows durations of plans and actual performance for task items, Design A, Design B, Design C, Implementation D, and Implementation E, along the time-line on the horizontal axis. The duration of a plan is displayed in a bar-shaped rectangular, and the duration of actual performance is displayed in a dotted line in parallel with the duration of the plan. The duration of the plans or actual performance, or other task items may be inputted from an input display selected by using a graphical user interface or a menu.

Figure 3B:
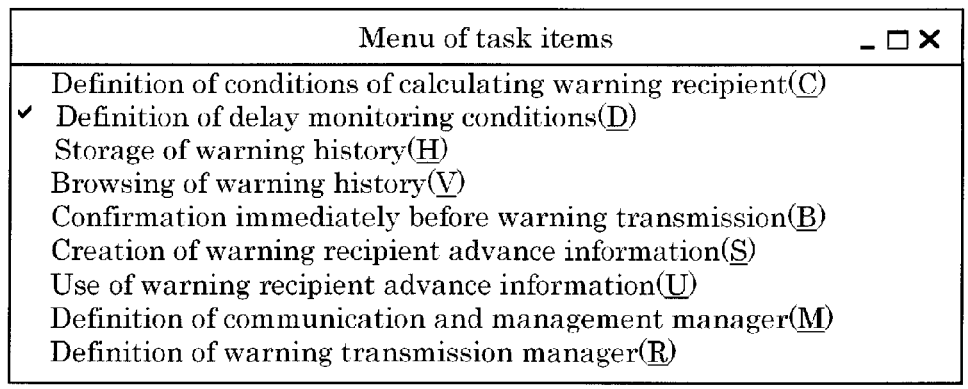
FIG. 3B is a display example showing a menu of task items.

For the plan in each task items, a user may define monitoring conditions of a delay or instruct to store or browse warning history information. The plan in each task items may be selected, for example, by highlighting a bar-shaped rectangular that shows a plan by using a left button of a mouse. In the schedule information shown in FIG. 3A, the bar-shaped rectangular for Design A in March is shaded, which indicates that this task item is selected and thus highlighted. As another method, instead of the bar-shaped rectangular, a character string, Design A, may be selected and highlighted. For example, when a task item is selected and then a right button of a mouse is pressed, a menu of task items as shown in FIG. 3B is displayed.

The menu of task items may display, for example, "Definition of conditions of calculating warning recipient", "Definition of delay monitoring conditions", "Storage of warning history", "Browsing of warning history", "Confirmation immediately before warning transmission", "Creation of warning recipient advance information", "Use of warning recipient advance information", "Definition of communication and management manager", "Definition of warning transmission manager", or the like. When a user selects any one of these items, a window is displayed in accordance with the selected item. For example, when the user selects "Definition of delay monitoring conditions", a check mark appears on the left of the item, and a window for defining conditions of monitoring a delay is displayed.

In the example described above, a corresponding window opens when an item in the menu of task items is selected. However, it may be a method in which a button is placed on a side of each task items in the schedule information and a window is displayed by clicking the button. In addition, plural sheets each having a tag and overlaying each other may be displayed in the schedule information, and a sheet may be displayed at the front when one of the tags is selected, and various definitions may be made on the sheet. The idea regarding methods for displaying a menu of task items described above is applicable to all examples also.

The task item, task plan, and actual task performance in the schedule information in FIG. 3A may be inputted by a user who actually planed the task or a user who performed the task, using a graphical user interface or the like. In addition, various definitions inputted from the menu of task items shown in FIG. 3B may be inputted by a delay warning transmission manager, not limited to by the user.

FIG. 3C (1), (2), and (3) are diagrams showing data structures of schedule information retained by the schedule information retaining unit 420. The data items may include, for example, project name, schedule table name, task item, task plan, actual task performance, warning recipient calculation condition ID, delay monitoring condition ID, delay information ID, warning history ID, warning pre-transmission confirmation defining ID, warning recipient advance information ID, warning recipient advance information use ID, warning recipient list ID, warning message ID, and warning transmitting manager ID.

For the schedule information, various IDs can be defined for each task items such that the information retained in one or more retaining unit other than the schedule retaining unit can also be referred to. For example, by using a delay monitoring condition ID, a same delay monitoring condition ID retained in the delay monitoring condition retaining unit 514 can be searched for, and the information of the delay monitoring conditions regarding the task item of the schedule can be referred to.

In a first exemplary embodiment, by using the warning recipient calculation condition ID, delay monitoring condition ID, delay information ID, warning transmission history ID, warning recipient list ID, warning message ID, and warning manager ID, a schedule delay can be detected in accordance with the defined delay monitoring conditions, and warning recipients to which a warning is to be transmitted can be calculated in accordance with the warning recipient calculation conditions. The information traced by these IDs may be the information inputted on a defining display that is activated through a menu of task items, or the information being a calculated result based on the inputted information. FIG. 3C (1), (2), and (3) show data structures of a first to a third exemplary embodiments. In the data structure of a fourth exemplary embodiment, the value of the warning recipient calculation information ID in FIG. 3C (1) to (3) is replaced with Recipient-Calculation-Condition-ID-002. In (1) and (2), there are items to which values are not defined; however, in such cases, the item itself does not necessarily exist.

Figure 3D:
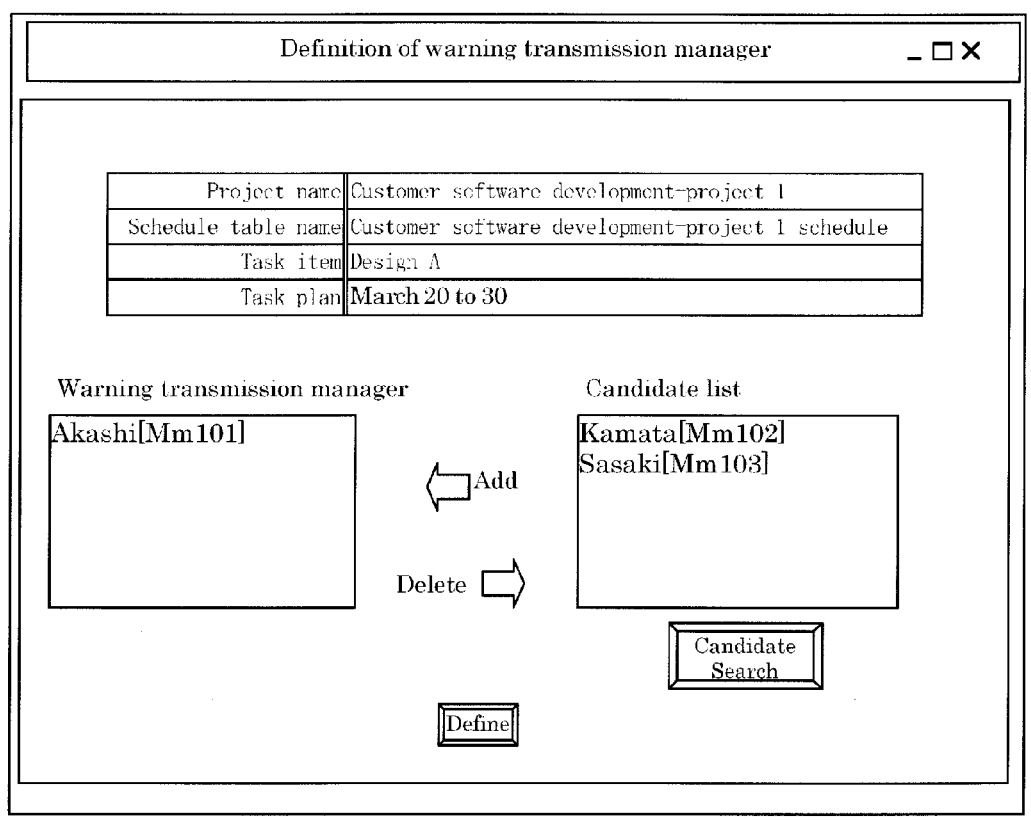
FIG. 3D is an example of a display for defining a warning transmission manager.

FIG. 3D is an example of a display for defining a warning transmission manager by the warning transmission manager defining unit 592. The warning transmission manager defining unit 592 enables definition of the warning transmission manager by using a graphical user interface as shown in FIG. 3D when the "Definition of warning transmission manager" in the menu in FIG. 3B is selected. In defining warning transmission managers, candidates may be searched for, and a candidate list for selecting therefrom may be displayed. This function may be activated by pressing "Candidate Search" button. The candidate list may be created from the information retained in the relating person data managing unit 600, such as the information retained in the member information retaining unit 650. A candidate can be defined by referring to the candidate list, and selecting the information that indicates a candidate, and adding it to a field for the warning transmission manager by using an arrow-shaped "Add" button. There is an arrow-shaped "Delete" button. The defined information of the warning manager may be retained in the warning transmission manager ID in FIG. 3C. Alternatively, it may be a method retained in other retaining units.

In FIG. 3D, a warning transmission manager or a candidate may be displayed in a pair of a name and a member ID that uniquely indicates the name. As an example, they may be displayed as "Akashi[Mm101]". Alternatively, it may be only the name of the manager or may be only the member ID, if it is uniquely identified. In the following exemplary embodiments, only the member ID that is uniquely identified is displayed.

FIG. 4A is an example of a display for defining conditions of calculating warning recipients by the warning recipient calculation condition defining unit 532. When a user selects the "Definition of conditions of calculating warning recipient" from the menu of task items shown in FIG. 3B, a display for defining warning recipient calculation conditions is displayed. The warning recipient calculation condition defining unit 532 may define the calculation conditions regarding a selected Design A in March, for example. On the defining display, project name, schedule table name, task item, and task plan of the schedule information are displayed, and a checkbox 700 is displayed below them by which the warning recipient calculation conditions can be defined.

The definition of the calculation conditions designates the range of warning recipients to be calculated. The items for designating the range may be classified into, for example, four items; item 702 to "calculate all of the relating persons assigned to the task item", item 704 to "designate a portion from among the relating persons assigned to the task item", item 706 to "calculate all of the coworkers and supervisors of the relating person assigned to the task item", and item 708 to "designate a portion from among coworkers and supervisors of the relating persons assigned to the task item". In addition, for the items 704 and 708 that need further designation, there are sub items such that further detailed designation can be made in the item.

The item 704 to "designate from among the relating persons assigned to the task item" is further classified into six sub items; all execution managers, a portion of execution managers, all communication managers, a portion of communication managers, all management managers, and a portion of management managers. In addition, the sub items, a portion of execution managers, a portion of communication managers, and a portion of management managers are further classified.

For example, "the relating persons assigned to the task item" described in item 704 means managers who are assigned to the task item. The managers include, for example, execution managers, communication managers, and management managers. In addition, the communication managers may be classified into three depending on types of their responsibility; accountability advisor, consulting advisor, and disclosure advisor. One person may hold these three responsibilities, or different persons may hold each of the responsibilities. Similarly, the management managers include nine types of responsibilities, and different persons may hold each type of the responsibilities or one person may hold a portion of or all types of the responsibilities. By designating these items, the range of warning recipients to be calculated is designated.

The "relating persons assigned to the task item" described in items 706 and 708 means the members who belong to a functional organization sectionalized into individual functions, or a project organization. Therefore, coworkers or supervisors of the relating person are included in them. More specifically, the range of the relating persons who relate to the relating person assigned to the task item is designated by using the relation in the organization to which the relating person belongs. The range designated here is the range to be calculated as warning recipients.

A user may designate the range to be calculated as warning recipients, for example, by selecting the items 702 and 708, and sub items in the item 708 as shown in FIG. 4A. There are some combinations in which the items to be selected are in an either-or choice. For example, the item 702 and the item 704 are in an either-or situation, and are displayed such that, when either one of the items is selected, the other item cannot be selected.

FIG. 4B is a diagram showing a data structure of defined warning recipient calculation conditions. The warning recipient calculation condition retaining unit 534 may retain the warning recipient calculation conditions defined by the warning recipient calculation condition defining unit 532. A warning recipient calculation condition ID, Recipient-Calculation-Condition-ID-001, is the information for uniquely designating the calculation condition. This is defined as an item having a same name as the schedule information shown in FIG. 3C.

For example, when the item 702 shown in FIG. 4A is selected, the value of "all relating persons assigned to the task item" that corresponds to the item 702 retained in the warning recipient calculation condition retaining unit 534 becomes "ALL-Relative-Member: TRUE". This makes the value of "a portion of the relating persons assigned to the task item" that corresponds to the item 704 being in the either-or choice become "Not-All-Relative-Member: FALSE". Alternatively, it is possible to designate nothing to the item 704. Similarly, when the item 708 is selected, the value of "all coworkers and supervisors of the relating person" that corresponds to the item 706 retained in the warning recipient calculation condition retaining unit 534 becomes "All-Upper-Manager-And-Member: FALSE", and the value of "a portion of coworkers and supervisors of the relating person" that corresponds to the item 708 becomes "Not-All-Upper-Manager-And-Member: TRUE, Project-Upper-Manager: TRUE, Project-Member: FALSE, Functional-Organization-Upper-Manager: TRUE, Functional-Organization-Member: FALSE", in accordance with the definition by the warning recipient calculation condition defining unit 532.

Figures 5A, 5B:
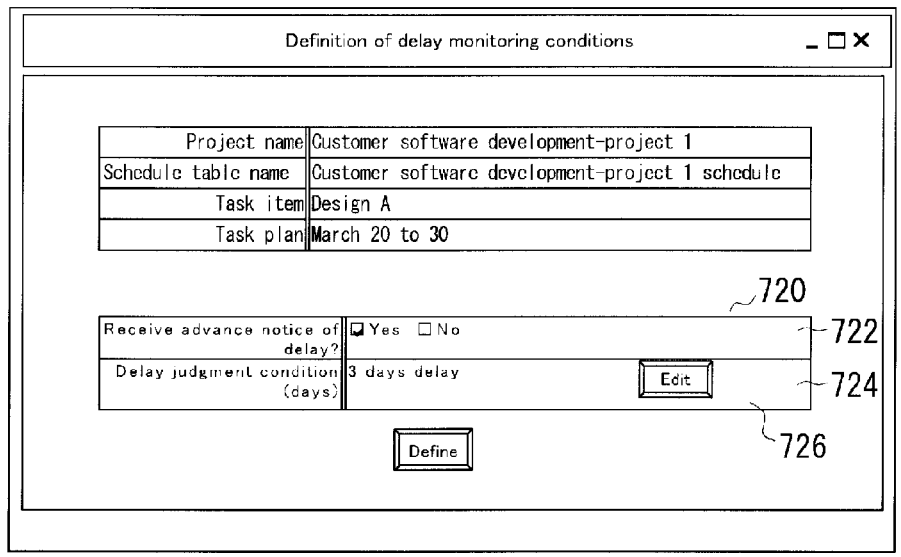
FIG. 5A is an example of a display for defining delay monitoring conditions.
FIG. 5B is a diagram showing a data structure of delay monitoring conditions.

FIG. 5A is an example of a display for defining delay monitoring conditions by the delay monitoring condition defining unit 512. The delay monitoring unit 510 monitors a delay of a schedule in accordance with defined delay monitoring conditions. The delay monitoring condition defining unit 512 may, for example, define delay monitoring conditions regarding the plan of a selected Design A in March. On a defining display, project name, schedule table name, task item, and task plan of the schedule information are displayed, and a checkbox 720 is displayed below them by which the monitoring conditions can be defined.

In item 722 for "Receive advance notice of delay?", there are checkboxes of "Yes" and "No", and a user can designate whether or not to receive an advance notice of a delay. If the user designates to receive an advance notice of a delay, the delay monitoring unit 510 can receive an advance notice when a task due date comes close and the advance notice of a schedule delay is notified from a person who relates to the task. Besides this example, there may be other definitions, for example, to receive a notice of a delay after the task due date. In addition, in item 724 for "Delay judgment condition (days)", there is an "Edit" button 726, and a user may designate the number of delayed days as a criterion for judgment. In the item 724, what is to be designated is not limited to the number of days, and time or a specified date may be designated. The method for the editing may be a method to select from a menu, or may be a method to input numerals only.

FIG. 5B is a diagram showing a data structure of defined delay monitoring conditions. The delay monitoring condition retaining unit 514 retains defined delay monitoring conditions by the delay monitoring condition defining unit 512. The data items may include, for example, delay monitoring condition ID, delay advance notice, delay judgment condition, and date and time the conditions are defined. The delay advance notice may be shown as "Receive" or "Not receive". A delay monitoring condition ID, Delay-Monitoring-Condition-ID-001, is the information for uniquely designating the delay monitoring condition. This is defined as an item having a same name as the schedule information shown in FIG. 3C.

FIG. 6A is an example of a display for defining storage of warning history by the warning history defining unit 562. The warning history managing unit 560 can retain a transmitted warning as history information, in accordance with warning history storage definition information. The warning history defining unit 562 can designate, for example, whether or not to store the warning history regarding the plan for a selected Design A in March. On a defining display, project name, schedule table name, task item, and task plan of the schedule information are displayed, and a checkbox 730 is displayed below them by which whether or not to store the warning history can be designated.

FIG. 6B is a diagram showing a data structure of a transmission history of a warning message. The warning history definition information retaining unit 564 retains the warning history storage definition information defined by the warning history defining unit 562. The data items may include, for example, warning history ID, storage, warning message ID, and transmission date and time. A warning history ID, Warning-Message-History-ID-001, is the information for uniquely designating the warning history. This is defined as an item having a same name as the schedule information shown in FIG. 3C. In the warning history retaining unit 566, a warning message ID and transmission date and time are automatically defined and retained after a warning message is transmitted, in accordance with the warning history definition information. The warning message ID in this example is Warning-Message-ID-001. The warning message ID and transmission date and time may be in a pair, and plural such pairs may be defined.

FIG. 6C is an example of a display for browsing a warning history. In this example, a graphical user interface as shown in FIG. 6C is displayed when the plan of Design A in March, one of the task items of the schedule information in FIG. 3A, is designated by clicking it to display a menu of task items, and then "Browsing of warning history", one of the task items in the menu, is selected. On a display for browsing a warning history, the information regarding the task item is displayed at the top, and the information regarding the warning history for the task item is displayed below it. The information may include transmission date and time of the warning, recipient, content of the message, and details. When a "Detail" button in the item of details is pressed, further detailed information is displayed.

The delay monitoring unit 510 detects the occurrence of a delay, in accordance with the delay monitoring conditions, by periodically monitoring the schedule information. The occurrence of a delay may be detected by comparing the task plan with the actual task performance. Of course, a method other than this example may be used. In addition, the delay monitoring unit 510 may detect an advance notice of a schedule delay by receiving an advance notice of a delay from a user. A method, which may be alternatively used, is to detect the occurrence of a delay by receiving a notice of occurrence of a delay after the due date of the task and detecting it.

When a schedule delay is detected, or an advance notice of a delay is received, or a notice of occurrence of a delay is received after the due date, by the delay monitoring unit 510, the delay information retaining unit 516 retains the information regarding the detected schedule delay. FIG. 7 is a diagram showing a data structure of delay information retained by the delay information retaining unit 516. The data items may include delay information ID, delay monitoring condition ID, presence or absence of a delay advance notice, presence or absence of a delay occurrence, and date and time the delay occurs. A delay information ID, Delay-Info-ID-001, is the information for uniquely designating the delay information. This is defined as an item having a same name as the schedule information shown in FIG. 3C.

FIGS. 8A to 8K show diagrams showing data structures of relating person data managed by the relating person data managing unit 600. The relating person data at least includes the information that correlates a task item where a delay occurs with the persons who relates to the task item, and the information that correlates with relating persons in an organization each other.

The information that correlates a task item with its relating persons may include the following information:

(a) Responsibility-sharing information that shows the correspondence between a task item and its execution managers.

(b) Responsibility-sharing information that shows the correspondence between a task item and its communication managers.

(c) Responsibility-sharing information that shows the correspondence between a task item and its management managers.

The information that correlates with relating persons based on the structure of an organization may include the following information:

(d) Organization information that shows the relation between members in an organization in a functional organization.

(e) Organization information that shows the relation between managers in a project organization.

The functional organization described above means an organization constructed by sectionalizing into individual functions. Examples of the functions may include research and development, human resources, or accounting. In addition, the project described above means an organization organized in accordance with a specific object or requirements for a specified period.

FIG. 8A is a diagram showing a data structure of task item responsibility-sharing information. The task item responsibility-sharing information shows task items in a project, and relating persons who relate to the task items, or managers; and the information is retained by the task item responsibility-sharing information retaining unit 610. The data items may include project name, task item, and items that show a series of relating persons, or managers.

To each task item, execution managers, communication managers, and management managers are assigned. For example, the communication managers are the persons who hold the responsibility of executing communication. To the communication managers, three types of advisors depending on their role responsibilities are assigned; accountability advisors who provide explanation to relating persons when a problem occurs, consulting advisors for a technical problem or a management problem, and disclosure advisors who hold the responsibility of disclosing information externally. To the management managers, nine types of advisors depending on their role responsibilities are assigned; advisors for managing scope of performance or method, advisors for time management such as scheduling, advisors for cost management, advisors for quality management, advisors for human resources management, for example, for human resources development, role- and responsibility-sharing, or building teamwork, advisors for managing communication with a stakeholder or the like, advisors for risk management, advisors for logistics management, and advisors for integrating these managements. It is to be noted that the advisors for managing communication in the management managers in this example hold the responsibility of managing communication, not the execution of communication.

For example, the execution manager of Design A is Mm101, who also serves as the accountability advisor. The consulting advisor is Mm106, and the disclosure advisor, the advisors for managing scope, time, cost, and communication is PM001. In addition, PM001 is also assigned to the advisor for quality management, and PM003 is assigned to advisors for managing human resources, risk, and logistics.

On the other hand, the execution manager of Design B is Mm202. For Design B, more authority is delegated, and also for the purpose of training Mm202, Mm202 is assigned to all of the management managers. By using the task item responsibility-sharing information, the relating person who is in charge of a task item can be obtained. In the correlation between a task item and its relating persons, the task item responsibility-sharing information corresponds to (a), (b), and (c) described above.

FIG. 8B is a diagram showing a data structure of functional organization information. The functional organization information shows a correlation between relating persons in an organization, and is retained by the functional organization information retaining unit 620. The data items may include section name, section leader ID, group name, group leader ID, and group member ID of a group that belongs to the section.

The section leader ID of a section having a name of Product software first development section is DM001, and the names of the groups that belong to the section are UI product development group, Web application product development group, and Mobile product development group. The group leader IDs for each groups are, GM001, GM002, and GM003, respectively. The members who belong to the UI product development group are indicated by group member IDs, and the values show the members are six persons; Mm101, Mm102, Mm103, Mm104, Mm105, and Mm106. In this example, the section leader ID, group leader ID, and group member ID are alphanumeric symbols; however, they may be actual names of persons as long as they are uniquely identified. In the correlation between relating persons described above, the functional organization information corresponds to (d).

FIG. 8C is a diagram showing a data structure of project organization information. The project organization information shows a correlation between relating persons in an organization, and is retained by the project organization information retaining unit 630. The data items may include program name, program manager ID, project name, project leader ID, and project member ID of a project that belongs to the program.

The program manager ID of a program whose program name is Customer software development program is PGL001, and the project leader ID of a project whose project name is Customer software development-Project 1 is PM001. The project member IDs are Mm101, Mm202, and Mm303. This means the members of the project are three persons. In addition, the project whose project name is Project management team is a project team that dedicatedly executes the management of other plural projects, in this case, Customer software development-Project 1 and Customer software development-Project 2. The members who participate in the project team have experience in project management. In this example, the members who dedicatedly execute the management of projects are organized into one project team similarly to other project such as Customer software development-Project 1. However, such an assembly of specialists may be organized, not into a project, but into one section of a functional organization that is sectionalized by functions. In the correlation between relating persons described above, the project organization information corresponds to (e).

More noteworthy among them are the group member ID shown in FIG. 8B and the project member ID shown in FIG. 8C. For example, Mm001 belongs to both of UI product development group and Customer software development-Project 1. This means that Mm001 belongs to a functional organization that is sectionalized by functions, and also participates in a short term project of software development in response to customer requirements. That is, the members of the project are members assembled from functional organizations that are sectionalized by functions. The structure of such an organization whose members are selected from the members of sectionalized functional organizations may be sometimes referred to as a matrix organization.

In FIG. 8C, the members of Customer software development-Project 1 are Mm101, Mm202, and Mm303. Others are defined as the persons who are not the members of the project. However FIG. 8A shows that, for each task items, Design A, Design B, Design C, Implementation D, and Implementation E, besides the members of Customer software development-Project 1, Mm101, Mm202, and Mm303, there are persons, PM001, PM002, PM003, Mm106, Mm205, and Mm304, who get involved in the some of the tasks. Their involvements are defined as other than project members. They are the members who do not hold the responsibility of execution, but hold the responsibility of auxiliary roles of the project such as communication or management, and assist the responsibilities. In this example, they are referred to as assist members. On the other hand, the members who are the members of the project and hold the responsibility without assistance are referred to as autonomous members.

Referring back to FIG. 8A, how members are assigned is described. The execution manager of a task item, Design A, is Mm101. However, Mm101 is not yet a specialist, and thus Mm106 of UI product development group, which is a sectionalized functional organization same as one to which Mm101 belongs, is assigned to a consulting advisor in the event of need. In this case, Mm106 belongs to a same group as Mm101 does, and has a better knowledge, skills, and experience than Mm101. Mm106 is a support member, and supports the execution of consulting of communication. Mm106 is referred to as a communication support member. In addition, for the disclosure advisor, PM001 holds the responsibility. PM001 is a support member, and is also referred to as a communication support member.

To the management managers, PM001, PM002, and PM003 are assigned. PM001, PM002, and PM003 are assigned from Project management team. This means that Mm101 still receives assistance from a team of specialists for management responsibility. In other words, to Design A of this project, the members who support management responsibility, PM001, PM002, and PM003, are assigned. These members are referred to as management support members.

On the other hand, Mm202, the execution manager of a task item, Design B, is the management managers of the task item. This means that, regarding management, more authority is delegated to Mm202 than Mm101. Mm202 is not a support member. In other words, for Design B of this project, the project members hold the responsibility of management without assistance from other than the members of the project, and thus they are referred to as management autonomous members.

The execution manager of Design C is Mm303, and Mm303 holds management responsibility, backed by assistance from the members of Project management team, PM001, PM002, and PM003. In this example, management training is performed by PM001 and PM002 for Mm303. In other words, the management assistance of Design C of this project also acts as training. In this case, trainers are PM001 and PM002, and are referred to as management trainer members. The trainee is Mm303, and is referred to as a management trainee member. In addition, regarding communication, the disclosure advisors are PM001 and Mm303, and PM001 trains a regular member, Mm303. Therefore, these member types may be referred to as communication trainer members and a communication trainee member.

Two execution managers of Implementation E, Mm202 and Mm303, hold the responsibility of management and execute the management through discussion each other, without assistance from the members of the management team. Also for communication, only the project members hold its responsibility. Therefore, there is no assistance or training for communication, and thus the members can be called as communication autonomous members. In addition, there is no assistance or training for management, and thus they can be called as management autonomous members.

FIG. 8D is a diagram showing a data structure of a member information database. The member information retaining unit 650 retains basic information of members. The member information database may include, for example, member ID, member name, telephone number, FAX number, e-mail address, and location. The member names in this example are displayed in Roman letters, however they may be displayed in Chinese characters. FIG. 8F is an example in which a portion of the member information database is displayed. "Akashi [Mm101], 9-00-9984" on the first line displayed in FIG. 8F corresponds to the data on the first line shown in FIG. 8D, "Mm101, Akashi, 9-00-9984", and it indicates the member name, member ID, and telephone number.

The units for defining relating person data in FIG. 8A to FIG. 8D may use a graphical user interface for their definition. In addition, it may be a method in which the relating person data is automatically created by converting data from an existing document file, spreadsheet data, or database, for example. The inputted relating person data is retained in the three retaining units described above.

From FIG. 8E to FIG. 8I are diagrams showing display examples by a graphical user interface. The graphical user interface may display a menu for defining relating person data, and may be activated and displayed, for example, when an item in the menu is selected. The function of activating the graphical user interface by the menu selection may be a function similar to that of FIG. 3B. In other words, a name of the menu, "Relating person information defining menu", is displayed on an upper portion of the menu display, and items of defining units to be activated are displayed below the menu. The items may be various items, such as input of functional organization information, input of project organization information, input of information of communication and management manager, and input of member information. The menu is shown in FIG. 8K.

FIG. 8E is a diagram showing an example of a display for inputting functional organization information. This is a display for inputting section name, section manager, group name, group leader, and group member. The data for these items are inputted in the column on the right of each item. In inputting, a database that includes candidate data may be browsed. For example, in inputting group members, a list of the names and member IDs of candidate members may be displayed by browsing a member information database. The list of candidate members may be displayed as extracted information from a portion of existing functional organization information or existing project organization information, or may be provided aside from these existing information, and retained. Then, a name and member ID may be selected from the list to input.

FIG. 8F is a diagram showing an example of a display for browsing a member information database when a group member is inputted. When a name is selected from a list and "Input" button is pressed, the name is inputted. Operations on a display may be as follows. In FIG. 8E, if there is an item whose database is to be displayed, place a checkmark in the checkbox in the rightmost column of the item, and press "Browse database" button. This enables to display the information of a database that may be a candidate. Based on the displayed information, FIG. 8E shows the status where various items, i.e., the information of section name, section manager, group name, group leader, and group member, are inputted. After the inputting is completed, press "Enter" button to retain the defined data as functional organization information.

The database may provide, depending on each items, a member information database regarding individual members, a section name database, a group name database, a program name database, and a project name database. It may be a method in which there is no individual database, and its equivalent information may be extracted from functional organization information or project organization information. In the case of FIG. 8D, in inputting the section name and group name, a section name database and a group name database are used. Of course, if there is no information to refer to in the database, new inputting can be done. In either case, a display for inputting new name is provided.

FIG. 8G is a diagram showing an example of a display for inputting project organization information. In this example, program name, programming manager, project name, project leader, and project members can be inputted. In inputting, similarly to the example of FIG. 8E, a database that includes candidate data may be referred to and browsed, and one of them may be selected and inputted. When the information about a member is to be inputted, a list of names and member IDs of candidate members may be displayed, or the list of candidate members may be displayed as extracted information from existing functional organization information or existing project organization information. In addition, in inputting program name and project name, a program name database and a project name database may be browsed.

FIG. 8H is a diagram showing an example of a display for inputting an execution manager, communication managers and management managers for a specified task item. This display is displayed when a task item is designated on the display of FIG. 3A, and then the menu of FIG. 3B is displayed, and the menu is selected. The communication managers are classified into three types. The management managers are classified into nine types. When they are to be inputted, similarly to the example of FIG. 8E, a list of names and member IDs of persons who can be candidates for the managers may be browsed by referring to a database, and one among them may be inputted. The list of candidates for managers may be displayed as a portion of existing functional organization information or existing project organization information. The method of operating on a display for browsing a database is same as that of FIG. 8E.

Figures 8I, 8J:
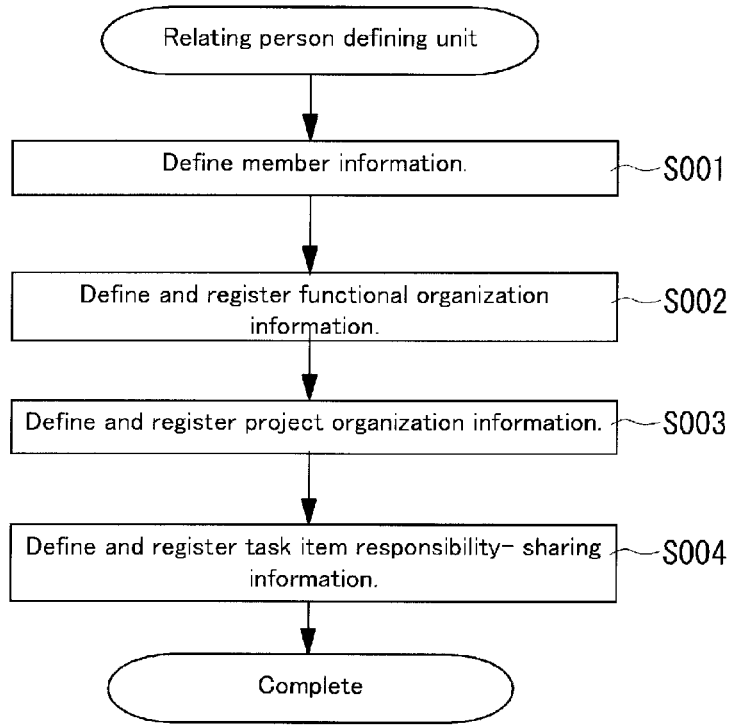
FIG. 8I is a diagram showing an example of a display for inputting member information.
FIG. 8J is a flowchart for illustrating an operation for creating a relating person database by a relating person defining unit.

FIG. 8I is a diagram showing an example of a display for inputting member information. When the information such as user name, telephone number, FAX number, e-mail address, location is inputted, and "Enter" button is pressed, the information is retained in the data structure of FIG. 8D. At this time, a member ID that can be uniquely identified is automatically created. The inputting may be done not only by using a user interface as in the examples described above, but may be done by reading data in a file. In the case where the member name is Sasaki, telephone number and location are inputted and the values are defined in FIG. 8D. Of course, the items of data that may be inputted may be other items besides this example, corresponding to a database, although they are not shown on the display. The graphical user interfaces of FIG. 8E to FIG. 8I are examples in which information is to be defined. However, a similar graphical user interface may be used even in a case where the information already defined is to be changed.

Referring now to a flowchart of FIG. 8J, an operation for creating relating person data by a relating person defining unit is described. The relating person data is the data shown in FIG. 8A to FIG. 8C, and created by using a graphical user interface or the like. The flowchart shown in FIG. 8J is an example, and a necessary step may be performed when it is required. This is an example where information is to be defined, however, even in a case where the information already defined is to be changed, a processing in accordance with following steps may be performed.

The relating person data defining unit 640 defines member information into a member information database as shown in FIG. 8D (step S001). For its definition, a graphical user interface as shown in FIG. 8I may be used.

Then, the relating person data defining unit 640 creates functional organization information as shown in FIG. 8B and registers it (step S002). Members may be defined based on the structure of an organization. The definition may be made in general when a new organization is created. Alternatively, partial changes may often be made. The members of a functional organization may be recruited from members of an existing functional organization, or if an existing project team is organized, members of a new functional organization may be organized by recruiting members among the team. For the definition or changes, a graphical user interface as in FIG. 8E may be used. In this example, the information to be defined are section name, section manager ID, group name, group leader ID, and group member ID. The ID is a character string by which a person is uniquely identified. After the inputting is completed and the data is defined, the data is retained in the functional organization information retaining unit 620.

Then, the relating person data defining unit 640 defines project organization information as shown in FIG. 8C, and registers it (step S003). A project team is organized and defined. The definition may be made in general when a new organization is created. Alternatively, partial changes may often be made. The members of a project team may be recruited from members of a functional organization, or if an existing project team is organized, members of a new project team may be organized by recruiting members among the team. A program is an organization formed by organizing plural project teams. For the definition, a graphical user interface as in FIG. 8F may be used. In this example, the information of the project organization to be defined includes program name, program manager ID, project name, project leader ID, and project member ID. After the inputting is completed and the data is defined, the data is retained in the project organization information retaining unit 630.

Finally, the relating person data defining unit 640 defines task item responsibility-sharing information as shown in FIG. 8A, and registers it (step S004). After schedules are defined for task items of a project as in FIG. 3A, managers are assigned for each task items, respectively. When a bar-shaped rectangular that indicates a plan of a task item, Design A, is designated and clicked, a menu as in FIG. 3B is displayed. The menu may include the item of "Definition of communication and management manager" for the task item. When the menu is selected, an input display is displayed. Various managers for the task item, i.e. execution managers, various communication managers, various management managers are defined. In a case where task item responsibility-sharing information is to be defined, the information to be defined may be defined such that the name or ID of members that are displayed as a portion of existing functional organization information or existing project organization information are referred to and selected as each of the managers. Such definition may be made by using a graphical user interface as in FIG. 8H. After the inputting of the information to be defined is completed and the data is registered, the data is retained in the task item responsibility-sharing information retaining unit 610.

Figure 9:
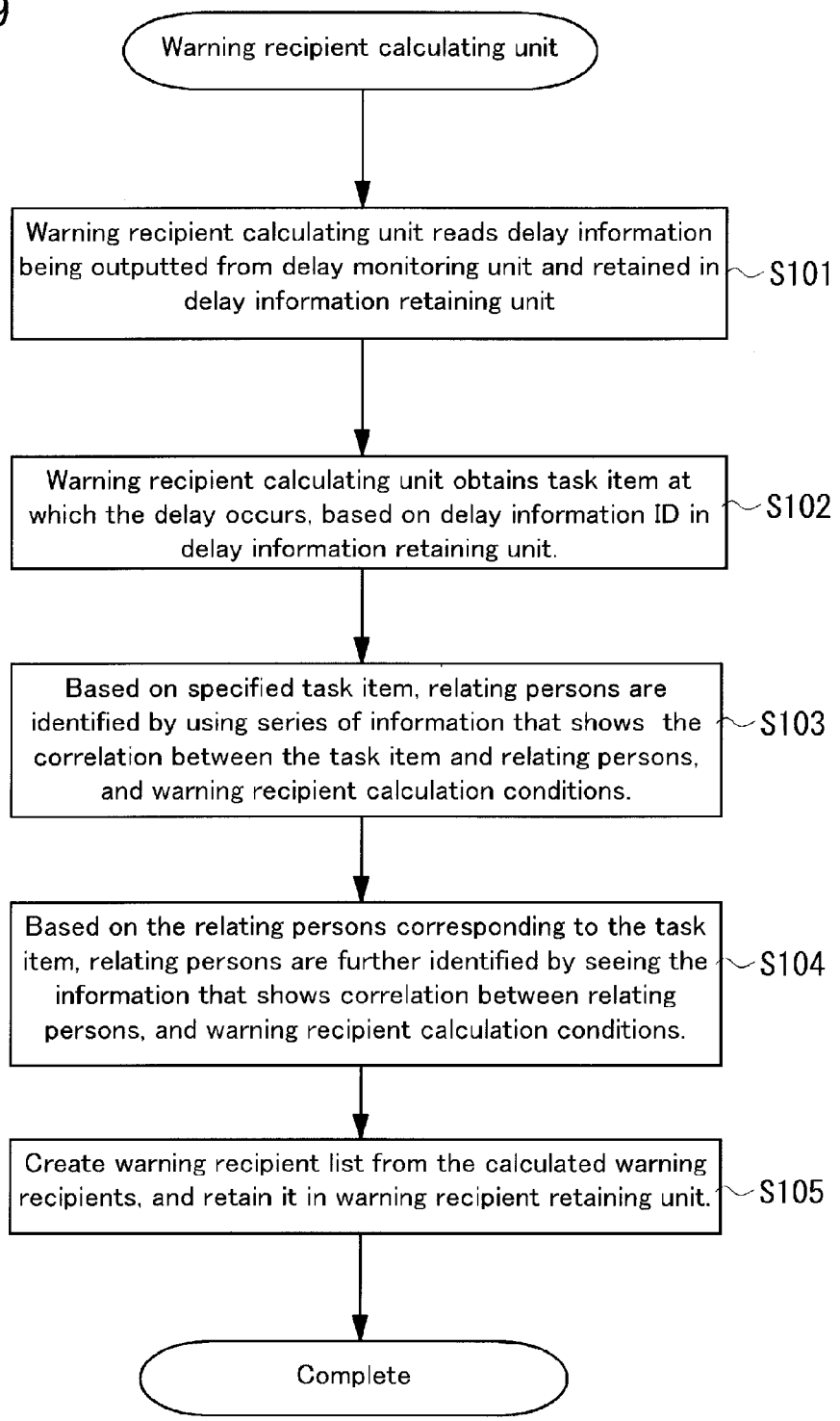
FIG. 9 is a flowchart for illustrating an operation for calculating warning recipients by a warning recipient calculating unit.

Referring now to a flowchart of FIG. 9, an operation for calculating warning recipients by a warning recipient calculating unit is described. At first, the warning recipient calculating unit 530 reads delay information that is outputted from the delay monitoring unit 510 and retained in the delay information retaining unit 516 (step S101). Based on the delay information ID of the read delay information, the warning recipient calculating unit 530 obtains a task item at which the corresponding delay occurs (step S102). For example, if the value of the delay information ID is "Delay-Info-ID-101", the column of the delay information ID included in the schedule information shown in FIG. 3C is searched for to specify that the value of the corresponding task item is Design A.

Then, based on Design A that is the specified value of the task item, relating persons who are managers are identified from the task item responsibility-sharing information retaining unit 610 (step S103). For the identification of the relating persons, calculation conditions retained in the warning recipient calculation condition retaining unit 534 may be used. For example, if the warning recipient calculation conditions shown in FIG. 4B is defined to calculate all of the relating persons who are assigned to the task item, the warning recipient calculating unit 530 identifies all of the relating persons of Design A from the task item responsibility-sharing information shown in FIG. 8A. More specifically, it identifies Mm101, Mm106, PM001, PM002, and PM003 that are the values that indicate the execution managers, communication managers, and management managers.

In this example, only the relating persons of Design A are identified; however, in a case where there are dependencies between the completion and the start of task items, for example, in a case where Design A is not yet completed or Design B is not yet started, a subsequent task item may be identified, and the relating persons of the subsequent task item may be identified similarly.

Then, based on the value of the relating persons who are assigned to the task item, the relating persons of warning recipients are identified from the correlation between relating persons, in accordance with the warning recipient calculation conditions (step S104). For example, in the warning recipient calculation conditions shown in FIG. 4B, the value of "All coworkers and supervisors of the relating person" is defined as FALSE, and the values of "A portion of coworkers of the relating person", "Supervisor of the project", and "Supervisor of the functional organization" are defined as TRUE, and the values of "Coworker of the project" and "Coworker of the functional organization" are defined as FALSE.

In such a status, based on the functional organization information shown in FIG. 8B and the project organization information shown in FIG. 8C, GM001 and PM001, two supervisors of the functional organization and the project to which the execution manager, Mm101, belongs to; and GM001, a group leader of a functional organization, UI product development group; and PM001, a group leader of Customer software development-Project 1 are identified as relating persons.

One of the communication managers, Mm106, belongs to UI product development group, a functional organization, but does not belong to a project. Therefore, only GM001, the supervisor of the functional organization, UI product development group, is identified as a relating person. In addition, PM001, PM002, and PM003, who are other managers, do not belong to a functional organization but belong to a project, Project management team. Therefore, only PGL001 who is the supervisor of a project organization is identified as a relating person.

The execution manager, Mm101, has coworkers. For example, the coworkers of a project, Customer software development-Project 1, are Mm202 and Mm303, and the coworkers of a group, UI product development group, are Mm102, Mm103, Mm104, Mm105, and Mm106. However, in the warning recipient calculation conditions, the warning to coworkers is not defined, and thus calculation is not made for coworkers.

Finally, the warning recipient calculating unit 530 outputs Mm101, Mm106, PM001, PM002, PM003, GM001, and PGL001, which are logical OR of the identified relating persons, as a warning recipient list together with a warning recipient list ID, and the warning list is retained in the warning recipient retaining unit 540 (step S105).

The processing of the step S103 and step S104 described above may be summarized as follows. The following (1) and (2) correspond to the step S103, and (3) and (4) correspond to the step S104.

(1) All of the relating persons who are assigned to a task item are identified as warning recipients. All managers assigned to the task item in FIG. 8A are identified as warning recipients.

(2) The relating persons designated in consideration of their role responsibilities from the relating persons who are assigned to the task item are identified as warning recipients. Designated managers in the task item responsibility-sharing information shown in FIG. 8A, who are a portion of managers assigned to the task item, are identified as warning recipients.

(3) Based on the relating persons identified in the step S103, all of the relating persons who are coworkers and supervisors are identified as warning recipients from the information that indicates the correlation between the relating persons, more specifically, from the functional organization information shown in FIG. 8B and the project organization information shown in FIG. 8C.

(4) Based on the relating persons identified in the step S103, a portion of the relating persons who are coworkers and supervisors, designated from the information that indicates the correlation between the relating persons, more specifically, from the functional organization information shown in FIG. 8B and the project organization information shown in FIG. 8C, are identified as warning recipients.

To comprehensively include methods for identifying and calculating relating persons, other methods such as set operations, weighting, determination based on performance data in the past, use of selection pattern by means of templates, range specification, support for individual requirements may also be used.

FIG. 10 is a diagram showing a data structure of a calculated warning recipient list. The warning recipient retaining unit 540 retains the warning recipients calculated by the warning recipient calculating unit 530 as a warning list. The data items may include, for example, warning recipient list ID and warning recipient list. A warning recipient list ID, Recipient-list-ID-001, is the information for uniquely designating the warning recipient list. This is defined as an item having a same name as the schedule information shown in FIG. 3C.

FIG. 11 is a diagram showing a data structure of a delay message. The warning execution unit 550 retains data regarding a delay message, and transmits a warning in accordance with the data. The data items may include, for example, warning message ID, warning recipient list ID, warning transmission manager ID, and content of the warning message. As a warning transmission manager ID, for example, Mm101 who made a series of definitions may be defined. It may be a source of the message.

The warning message is transmitted to a warning recipient list ID and a warning transmission manager ID, wherein an e-mail address that corresponds to a member ID may be used for the address for transmission. Alternatively, instead of an e-mail, the warning may be a voice message to a telephone, or FAX. In such cases, the content of the warning message may be audio data or FAX data.

When an e-mail address is to be found out for transmission of an e-mail to a warning recipient or a warning transmission manager, a warning recipient ID list or a warning transmission manager ID may be used to be converted into an e-mail address. As a method for the conversion, a member information database in which contact information such as an e-mail address is written may be searched for and converted. Alternatively, a method for converting data into a telephone number of FAX number may be used. Such numbers may be defined in a member information database, and searched for.

A warning message ID, Warning-Message-ID-001, is the information for uniquely designating the warning message. This is defined as an item having a same name as the schedule information shown in FIG. 3C. In addition, if it is defined to store a warning history by the warning history definition information retaining unit 564, a warning history as shown in FIG. 6B including a warning message ID is stored in the warning history retaining unit 566, after a warning message is transmitted. If necessary, it may be browsed on a display as shown in FIG. 6C by the warning message browsing unit 568.

Figure 12:
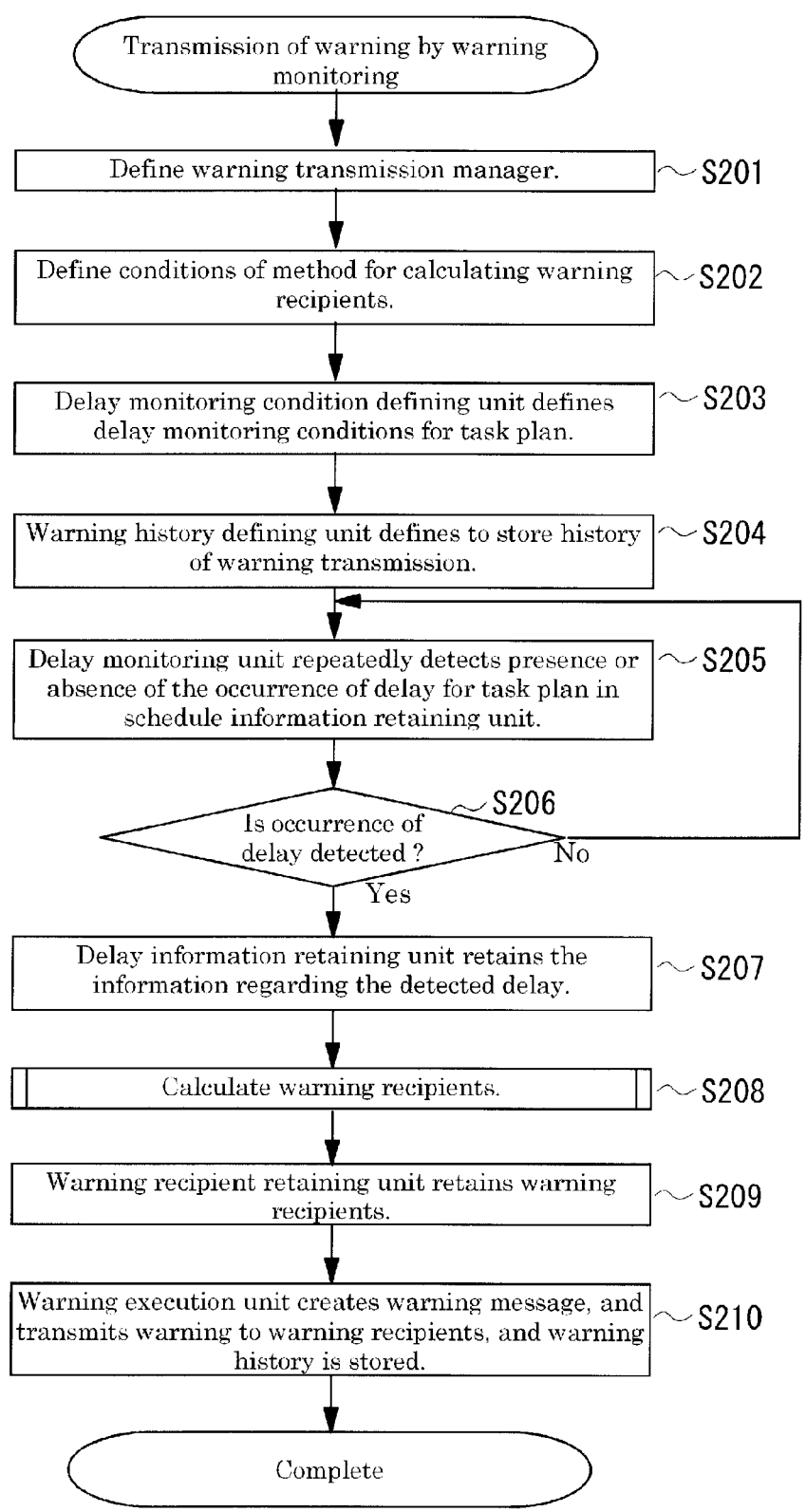
FIG. 12 is a flowchart for illustrating an operation for transmitting a warning by a schedule warning system.

Referring now to a flowchart of FIG. 12, an operation for transmitting a warning according to a first exemplary embodiment is described. At first, the warning transmission manager defining unit 592 defines a warning transmission manager in accordance with an instruction by a user (step S201). After the warning transmission manager is defined, the warning recipient calculation information defining unit 522 defines conditions of a method for calculating warning recipients in accordance with an instruction by a user (step S202). The defined calculation conditions are retained by the warning recipient calculation condition retaining unit 534. Then, the delay monitoring condition defining unit 512 defines delay monitoring conditions of a task plan of the schedule (step S203). The delay monitoring conditions may be defined for each task items of the schedule, and retained by the delay monitoring condition retaining unit 514. After that, the warning history defining unit 562 defines to store the warning transmission history (step S204). By this step, a transmitted warning may be retained by the warning history information retaining unit 566 as history information.

After various definitions are made, the delay monitoring unit 510 repeatedly detects presence or absence of the occurrence of a schedule delay in accordance with these definitions for the task plan that the schedule information retaining unit 420 retains (step S205), and determines whether or not the occurrence of a delay is detected (step S206). If it is determined that the occurrence of a delay is not detected, the delay monitoring unit 510 continues to monitor the occurrence of a schedule delay. If it is determined that the occurrence of a delay is detected, the information regarding the detected delay is retained by the delay information retaining unit 516 (step S207).

Then, the warning recipient calculating unit 530 calculates warning recipients to which a warning is to be transmitted, based on the delay information that the delay information retaining unit 516 retains (step S208). At this time, the warning recipient calculating unit 530 refers to warning recipient calculation conditions, and task item responsibility-sharing information, functional organization information, and project organization information, which are retained by the relating person data managing unit 600. Calculated warning recipients are retained by the warning recipient retaining unit 540 as a warning recipient list (step S209). Finally, the warning execution unit 550 creates a warning message, and transmits a warning in accordance with the retained warning recipient list, and the transmitted warning message is stored by the warning history retaining unit 566 as history information (step S210). If necessary, a user may browse warning history messages.

A schedule warning system according to a second exemplary embodiment is now described. In the calculation of warning recipients and transmission of a warning based on the data that indicates the relating persons assigned to a task and a correlation between relating persons in an organization the relating persons belong to, described in the second exemplary embodiment are: an example where whether or not a warning to warning recipients is to be transmitted is confirmed and designated after the occurrence of a delay and immediately before the transmission of a warning, an example where criterion of a schedule delay can be defined for each tasks, and an example where an advance notice of a schedule delay is supported.

FIG. 13A is an example of a display for defining a confirmation before transmitting a warning by the warning recipient advance information creating unit 520. For example, the warning recipient advance information creating unit 520 can designate whether or not to confirm with a transmission manager regarding a plan in March of a selected Design A, at the time after a delay is detected and immediately before a warning is transmitted. On a display for definition, project name of the schedule information, schedule table name, task item, and task plan may be displayed, and a checkbox 740 may be displayed below them, by which whether or not a confirmation with a warning transmission manager immediately before the transmission is to be made may be designated.

FIG. 13B is a diagram showing a data structure of a confirmation definition immediately before transmitting a warning. The warning recipient advance information status retaining unit 522 retains a warning pre-transmission confirmation defined by the warning recipient advance information creating unit 520. The data items may include, for example, warning pre-transmission confirmation defining ID, warning pre-transmission confirmation, and warning advance confirmation message ID. If it should be confirmed immediately before transmission, the value of the warning pre-transmission confirmation becomes TRUE. In addition, when a message for confirming immediately before a warning transmission is created, the value of a warning advance confirmation message ID is defined. A warning pre-transmission confirmation defining ID, Warning-Confirmation-Setting-ID-001, is the information for uniquely designating the warning recipient pre-transmission confirmation definition. This is defined as an item having a same name as the schedule information shown in FIG. 3C.

After warning recipients are calculated and a warning recipient list is retained in the warning recipient retaining unit 540, the warning recipient controlling unit 580 checks whether or not the value of the warning pre-transmission confirmation defining ID is defined for the schedule information shown in FIG. 3C that the schedule information retaining unit 420 retains. If it is defined, the warning recipient pre-transmission confirmation unit 582 can confirm that the value of the warning pre-transmission confirmation shown in FIG. 13B is TRUE. In such a case, the warning recipient pre-transmission confirmation unit 582 is activated.

FIG. 14 is a diagram showing a data structure of content of a confirmation mail for inquiring of a warning transmission manager as to whether or not a warning is to be transmitted, immediately before a user transmits the warning. FIG. 15 is an example of a display for a warning transmission manager to define the confirmation of warning recipients. The warning transmission manager receives a confirmation mail with content as shown in FIG. 14, and opens a described URL for confirmation, and thereby designates whether or not a warning is to be transmitted by the warning pre-transmission confirmation defining unit 584 from the display shown in FIG. 15 for individual members in the warning list, and creates the information whether or not transmission is to be done. The warning pre-transmission confirmation defining unit 584 makes the warning pre-transmission confirmation definition information retaining unit 586 retain the warning pre-transmission confirmation definition, and makes the warning recipient retaining unit 540 retain it as a warning recipient list confirmed by the warning transmission manager and to which information whether or not transmission is to be done is added.

The content of a warning pre-transmission confirmation message includes a warning transmission manager ID, and the value of the member ID is Mm001. For the address of Mm001, an e-mail address that corresponds to the member ID may be used. Instead of an e-mail, a voice message to a telephone or FAX may be used. In such cases, the content of the message may be audio data or FAX data.

In a case where an e-mail address is to be found out for transmitting an e-mail to a warning transmission manager, a warning transmission manager ID may be used to convert it into an e-mail address. For the conversion, a method for searching through a member information database in which contact information such as an e-mail address is stored may be used. Alternatively, a method for converting data into a telephone number or FAX number may be used. Such numbers may be defined in a member information database, and searched for.

In the display for confirming warning recipients immediately before transmission shown in FIG. 15, whether or not a transmission is to be done may be designated by marking the checkboxes for each item for the recipients. In addition, when "Browse" on the display in the detail information of a recipient is clicked, the organization the recipient belongs to, for example, may be displayed. For example, when "Browse" in the column of Mm106 is clicked, the task item responsibility-sharing information, functional organization information, project organization information of Mm106, and whether or not Mm106 is a support member are displayed. The information displayed in this case includes the items below: "Project name: Customer software development-Project 1", "Task item: Design A", "Communication responsibility: consulting", "Management responsibility: none", "Support: support member", "Functional organization it belongs to: Product software first development section, UI product development group", "Project it belongs to: none". These items may be displayed in a small popup window.

FIG. 16 is a diagram showing a data structure of a confirmed warning recipient list with the information whether or not transmission is to be done. The data items may include, for example, warning recipient list ID and warning recipient list (with the information whether the warning is to be transmitted or not). For each warning recipients, the information whether or not transmission is to be done is designated. For example, when it is designated to transmit a warning to Mm001, it is defined as "Mm001: Send". On the other hand, when it is designated not to transmit a warning to GM001, it is defined as "GM001: Not-Send".

Referring now to a flowchart of FIG. 17, an operation for transmitting a warning by a second exemplary embodiment is described. In the second exemplary embodiment, a warning recipient is confirmed by a warning transmission manager immediately before transmitting a warning, and then a warning is transmitted.

At first, the warning transmission manager defining unit 592 defines a warning transmission manager in accordance with an instruction by a user (step S301). After the warning transmission manager is defined, the warning recipient calculation information defining unit 522 defines conditions of a method of calculating warning recipients in accordance with an instruction by a user (step S302). Then, the delay monitoring condition defining unit 512 defines delay monitoring conditions of a task plan of the schedule (step S303). Then, the warning history defining unit 562 defines to store the warning transmission history (step S304). The warning pre-transmission confirmation defining unit 582 designates whether or not confirmation of warning recipients with a warning transmission manager is to be done immediately before the warning transmission (step S305).

After various definitions are made, in accordance with these definitions, the delay monitoring unit 510 repeatedly detects the occurrence of a schedule delay for the task plan that the schedule information retaining unit retains (step S306), and determines whether or not the occurrence of a delay is detected (step S307). When it is determined that the occurrence of a delay is detected, the information regarding the detected delay is retained by the delay information retaining unit 516 (step S308).

Then, the warning recipient calculating unit 530 calculates warning recipients to which a warning is to be transmitted, based on the delay information that the delay information retaining unit 516 retains (step S309). The calculated warning recipients are retained by the warning recipient retaining unit 540 (step S310).

The warning recipient controlling unit 580 confirms whether or not the warning pre-transmission confirmation is defined to confirm with a warning transmission manager (step S311), and determines whether or not it is defined (step S312). After it is determined that it is defined, the warning pre-transmission confirmation unit 582 confirms whether or not a transmission is to be done to the warning recipients (step S313), and determines whether or not a confirmation by the warning transmission manager is made (step S314). When it is determined that it is confirmed, the warning execution unit 550 creates a warning message, and transmits a warning based on a confirmed warning recipient list retained by the warning recipient retaining unit 540 (with information to or not to transmit) (step S315). The transmitted warning message is stored by the warning history retaining unit 566 as history information. If necessary, the transmission history transmitted in the past may be browsed.

A schedule warning system according to a third exemplary embodiment is now described. In the third exemplary embodiment, before a delay occurs, warning recipients are calculated and a method for controlling transmission is defined for the warning recipients calculated in advance. The warning recipients calculated in advance and the information for controlling transmission are referred to as warning recipient advance information. When a delay occurs, the warning recipient advance information may be used to transmit a warning. The term, "advance" used here means before the occurrence of a delay.

FIG. 18A is an example of a display for defining warning recipient advance information by the warning recipient advance information creating unit 520. For example, regarding the plan in March of a selected Design A, the warning recipient advance information creating unit 520 can calculate warning recipients and start definition of the transmission control to the warning recipients, before a delay occurs, in other words, in advance. On a display for definition, project name of the schedule information, schedule table name, task item and task plan are displayed, and below them, a checkbox 750 may be displayed by which whether or not warning recipient advance information is to be defined can be designated.

FIG. 18B is a diagram showing a data structure of warning recipient advance information. The warning recipient advance information status retaining unit 590 retains the warning recipient advance information created by the warning recipient advance information creating unit 520. The data items may include, for example, warning recipient advance information ID and warning recipient advance information status. When the creation of the advance information starts, the item of the warning recipient advance information status is displayed as "Creation started". In addition, when the creation of the advance information completes, it is displayed as a character string, "Creation completed". A warning recipient advance information ID, Recipient-Pre-Setting-ID-001, is the information for uniquely identifying the warning recipient advance information. This is defined as an item having a same name as the schedule information as shown in FIG. 3C.

The warning recipient calculating unit 530 of the second exemplary embodiment is activated, based on the fact that the value of the warning recipient advance information status is "Creation started". After the activation, the value of the warning recipient advance information status is changed to "Creating". Then, the warning recipient calculating unit 530 creates a transmission list from the calculated warning recipients, based on the warning recipient calculation conditions retained by the warning recipient calculation condition retaining unit 534, and the task item responsibility-sharing information, the functional organization information, and the project organization information, which are managed by the relating person data managing unit 600. The list is retained in the warning recipient retaining unit 540.

Figure 19A:
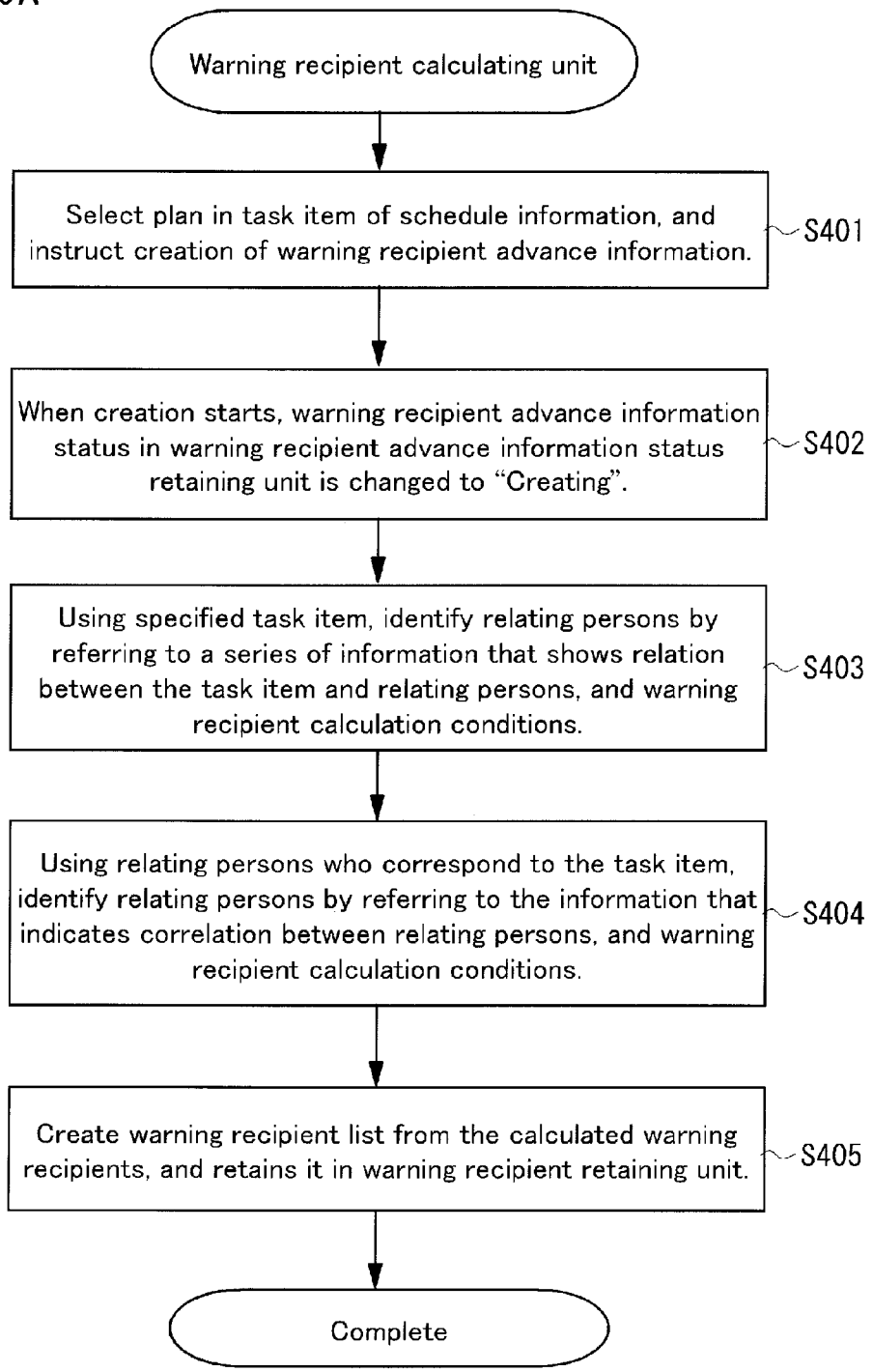
FIG. 19A is a flowchart for illustrating an operation for calculating warning recipients by a warning recipient calculating unit.

Referring now to a flowchart of FIG. 19A, an operation for calculating warning recipients by a warning recipient calculating unit is described. At first, a user selects a task item from the schedule information shown in FIG. 3A, and instructs creation of warning recipient advance information from the menu of task items shown in FIG. 3B (step S401). In accordance with the instruction by the user, the warning recipient advance information creating unit 520 starts to create warning recipient advance information. When the creation starts, the warning recipient advance information status is retained in the warning recipient advance information status retaining unit 522 as "Creation started".

If the warning recipient advance information status retained in the warning recipient advance information status retaining unit 522 is "Creation started", the warning recipient calculating unit 530 starts the creation of warning recipient advance information. When it starts, the warning recipient advance information status is changed to "Creating" (step S402).

Then, the warning recipient calculating unit 530 identifies relating persons by referring to a series of information that indicates the relation between the task item and relating persons, using the task item that is specified; in other words, referring to the task item responsibility-sharing information retained in the relating person data managing unit 600 and warning recipient calculation conditions (step S403).

In addition, by using the relating persons who correspond to the task item, the warning recipient calculating unit 530 further identifies relating persons by referring to the information that indicates a correlation between the relating persons, in other words, referring to the functional organization information and the project organization information that are retained in the relating person data managing unit 600, and the warning recipient calculation conditions (step S404).

Finally, the warning recipient calculating unit 530 creates a warning recipient list from the calculated warning recipients, and makes the warning recipient retaining unit 540 retain it (step S405). The value of the warning recipient advance information status is defined as "Creation completed".

FIG. 19B is a diagram showing a data structure of a previously calculated warning recipient list with control information. The data items may include, for example, warning recipient advance information ID, warning recipient list ID, and warning recipient list (with control information). To the warning recipient list, control information may be added.

FIG. 20A is an example of a display for defining what type of control is to be made for a warning to be transmitted to the warning recipients in the previously calculated warning recipient list. After a warning recipient list is calculated, the warning recipient control information defining unit 588 displays a display for definition. FIG. 20B is a menu for defining control information for a warning recipient. A user may select individual warning recipients to display a control information menu shown in FIG. 20B, and select "Immediately transmit", "Hold transmission", or "Specify transmission date" as control information; thereby the type of transmission may be defined. When an item of the warning recipients, for example, Mm101, is selected, a control information menu is displayed, and the control information may be defined.

FIG. 20C is a diagram showing a data structure of a previously calculated warning recipient list, and warning recipient advance information to which control information defined for the list is added. The warning recipient advance information may be retained by the warning recipient advance information retaining unit 590, and the data items may include, for example, warning recipient advance information ID, warning recipient list ID, and warning recipient list (with control information). As such, the warning recipient advance information is created, and the value of the warning recipient advance information status that is the item of the warning recipient advance information is changed from "Creating" to "Creation completed", and retained in the warning recipient advance information status retaining unit 522.

Figure 21:
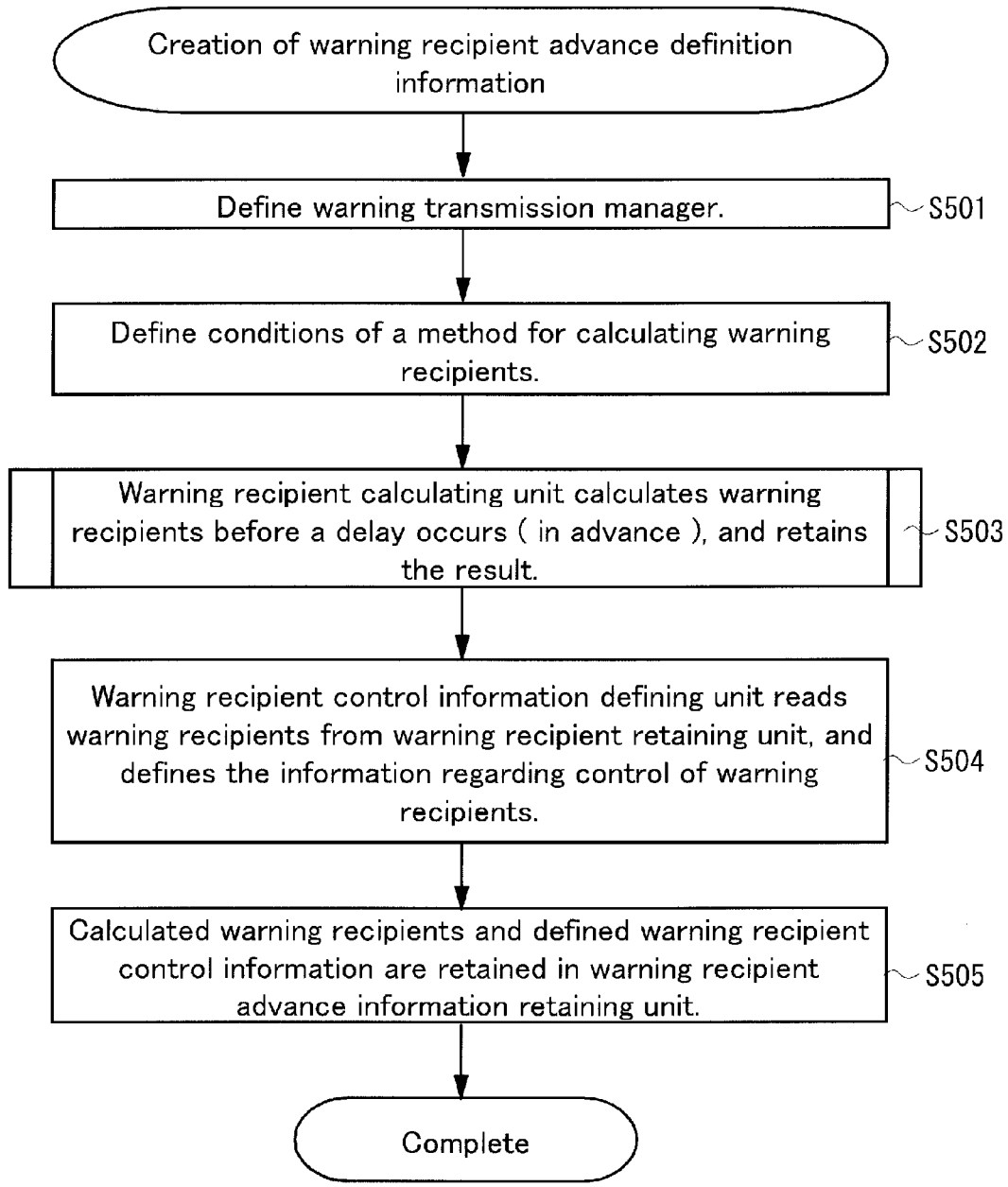
FIG. 21 is a flowchart for illustrating an operation for defining advance information by a warning recipient control information defining unit.

Referring now to a flowchart of FIG. 21, an operation for defining advance information by a warning recipient control information defining unit is described. At first, the warning transmission manager defining unit 592 defines a warning transmission manager in accordance with an instruction by a user (step S501). After the warning transmission manager is defined, the warning recipient calculation condition defining unit 532 defines conditions of a method for calculating warning recipients (step S502). Then, the warning recipient advance information creating unit 520 instructs to start the creation of warning recipient advance information, regarding a selected task item of the schedule information. In addition, when the creation starts, the warning recipient advance information status is changed from "Creation started" to "Creating", and is retained by the warning recipient advance information retaining unit 590.

The warning recipient calculating unit 530 checks that the warning recipient advance information status is "Creation started", and calculates warning recipients before a delay occurs (in advance), based on the warning recipient calculation conditions retained by the warning recipient calculation condition retaining unit 534 and the relating person data managed by the relating person data managing unit 600. The calculated warning recipients are retained in the warning recipient retaining unit 540 as a warning recipient list (step S503).

The warning recipient control information defining unit 588 reads the warning recipient list from the warning recipient retaining unit 540, and defines the information regarding control of the warning recipients (step S504). At this time, the warning recipient advance information status is changed to "Creating". When the control information is defined, the control information defined regarding the control of transmission to the warning recipients is added to the warning recipient list calculated before a delay occurs, and retained in the warning recipient advance information retaining unit 590 as warning recipient advance information (step S505). At this time, the warning recipient advance information status is changed to "Creation completed".

Now, transmission of a warning by delay monitoring that uses previously defined advance information is described.

Figures 22A, 22B:
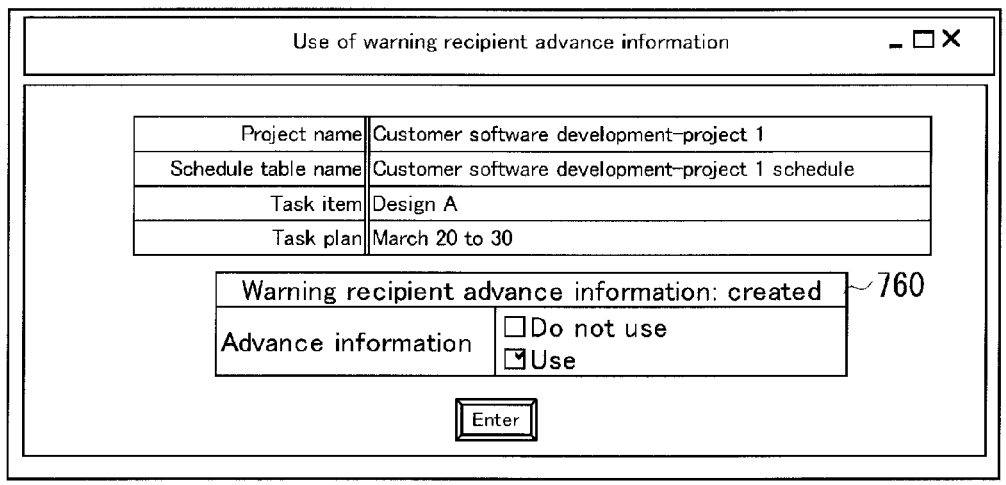
FIG. 22A is an example of a display for defining use of warning recipient advance information.
FIG. 22B is a diagram showing a data structure of defined information of the use of advance information.

FIG. 22A is an example of a display for defining the use of warning recipient advance information by the warning recipient advance information use defining unit 570. The warning recipient advance information use defining unit 570 may designate whether or not the advance information of warning recipients is to be used, for example, regarding the plan in March of a selected Design A. On a display for definition, project name of the schedule information, schedule table name, task item and task plan are displayed, and below them, a checkbox 760 is displayed by which whether or not the advance information of warning recipients is to be used can be designated.

FIG. 22B is a diagram showing a data structure of definition information of the defined use of advance information. The warning recipient advance information use definition retaining unit 572 retains definition information of the use of the advance information defined by the warning recipient advance information use defining unit 570. The data items may include, for example, warning recipient advance information use ID and "Use advance information". In a case where the advance information is to be used, the value of the "Use advance information" is described as TRUE. In a case where advance information is not to be used, the value of the "Use advance information" is described as FALSE. The definition information is uniquely identified by Recipient-Pre-Setting-Use-ID-001 that is a warning recipient advance information use ID. In addition, the warning recipient advance information use ID is defined as an item having a same name as the schedule information shown in FIG. 3C.

The warning recipient calculating unit 530 checks whether it is defined to use the warning recipient advance information in the warning recipient advance information use definition retaining unit 572, and, if it is defined to use, at the time of a delay occurs, forwards processing to the warning recipient controlling unit 580 without performing the calculation of warning recipients. The warning recipient controlling unit 580 reads the warning recipient advance information in which warning recipient list (with control information) is contained, from the warning recipient advance information status retaining unit 522. Then, the warning recipient controlling unit 580 examines the warning pre-transmission confirmation definition information as to whether the warning transmission manager confirms the warning recipient list immediately before transmission. The warning execution unit 550 refers to the warning recipient list and the warning recipient advance information in which control information is contained, and creates a delay warning message, and transmits a warning.

FIG. 23 is a diagram showing a data structure of a created warning message. The data items of the warning message may include, for example, warning message ID, warning recipient advance information ID, warning transmission manager ID, and message. The warning execution unit 550 transmits a warning based on the content. In addition, the warning execution unit 550 refers to the transmission history definition information of the warning history definition information retaining unit 564, and if the value of a data item, storage, is TRUE, stores the transmission history.

Figure 24:
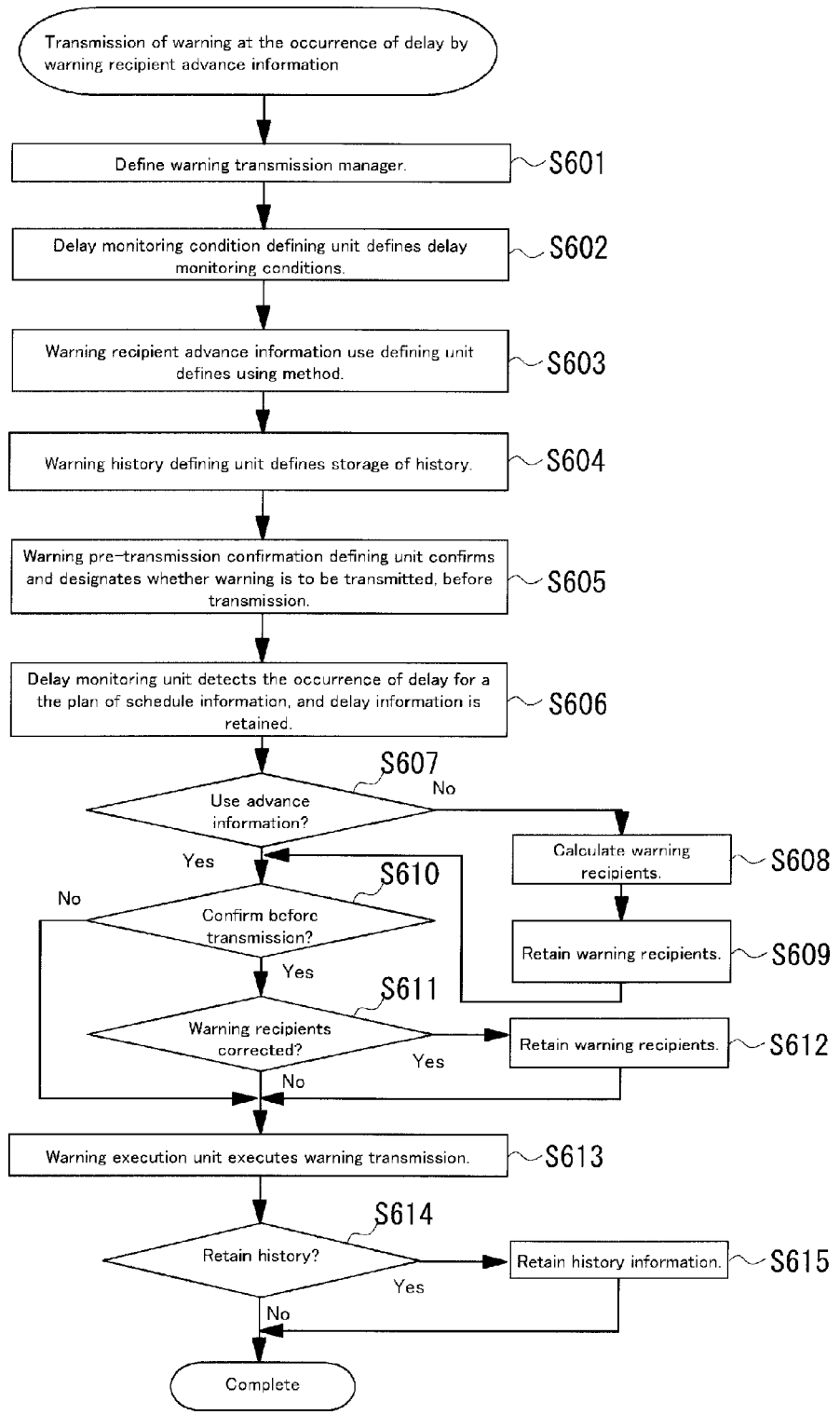
FIG. 24 is a flowchart for illustrating an operation for transmitting a warning by a schedule warning system according to a third exemplary embodiment.

Referring to a flowchart of FIG. 24, an operation for transmitting a warning according to a third exemplary embodiment is described. In the third exemplary embodiment, by using defined warning recipient advance information, warning recipients are confirmed by a warning transmitting manager immediately before transmitting a warning, and then the warning is transmitted. All in the flowchart is not necessarily required. Any one that is defined before starting the flow may be omitted.

At first, the warning transmission manager defining unit 592 defines a warning transmission manager in accordance with an instruction by a user (step S601). Then, the delay monitoring condition defining unit 512 defines delay monitoring conditions of a task plan of the schedule (step S602).

Then, the warning recipient advance information use defining unit 570 defines a method for using the advance information (step S603). Then, the warning history defining unit 562 defines storage of the warning transmission history (step S604). Then, the warning pre-transmission confirmation defining unit 584 defines whether or not the transmission of the warning is to be confirmed with the warning transmission manager before the transmission (step S605).

After various definitions are made, in accordance with these definitions, if the occurrence of a schedule delay is detected, the delay monitoring unit 510 retains the information regarding the detected delay about the task plan that the schedule information retaining unit retains in the delay information retaining unit 516 (step S606)

When a schedule delay occurs, the warning recipient calculating unit 530 determines whether or not the advance information is to be used, based on the definition information shown in FIG. 22B that the warning recipient advance information use definition retaining unit 572 retains (step S607). When it is determined not to use advance information, the warning recipient calculating unit 530 calculates the warning recipients (step S608), and calculated warning recipients are retained by the warning recipient retaining unit 540 (step S609).

When it is determined to use advance information, the warning recipient controlling unit 580 determines whether or not the warning transmission manager confirms a recipient before transmitting a warning, based on the warning pre-transmission confirmation definition information (step S610). When it is determined to confirm, the warning recipient controlling unit 580 determines whether or not the determination of transmission in the warning recipient list is corrected by the warning transmission manager (step S611). When the warning recipients are corrected, a list of the corrected warning recipients is retained in the warning recipient retaining unit 540 (step S612).

Then, the warning execution unit 550 creates a warning message, and transmits a warning based on the warning recipient list the warning recipient retaining unit 540 retains (step S613). The warning history managing unit 560 determines whether or not to retain history information, based on the transmission history definition information (step S614). When it is determined to retain the history information, the warning information history retaining unit 566 retains the transmitted warning as history information (step S615).

Now, a schedule warning system according to a fourth exemplary embodiment is described. The fourth exemplary embodiment relates to but differs from the warning recipient calculation condition defining unit 532 as shown in FIG. 4A, the warning recipient calculation condition retaining unit 534 as shown in FIG. 4B, and the warning recipient calculating unit 530, in the first to third exemplary embodiments.

FIG. 25A is an example of a display for defining conditions of calculating warning recipients by the warning recipient calculation condition defining unit 532. When a user selects "Definition of conditions of calculating warning recipient" from the menu of task items shown in FIG. 3B, a display for defining warning recipient calculation conditions is displayed. The warning recipient calculation condition defining unit 532 may define calculation conditions of warning recipients, for example, regarding a selected Design A in March. On a display for definition, project name of the schedule information, schedule table name, task item and task plan are displayed, and below them, a checkbox 770 is displayed by which warning recipient calculation conditions can be defined.

In terms of the task item responsibility-sharing information regarding the responsibility for a specific task item, there are a case where members of a project team of a task item autonomously hold the responsibility, and a case where members who are not the members of the project team hold the responsibility to support the project. The former members are referred to as autonomous members, and the latter members are referred to as support members.

To define calculation conditions is to designate the range of warning recipients to be obtained by calculation. The items for designating the range is broadly classified into to five; "All of execution managers of the task item", "All of autonomous members of the task item", "A portion of autonomous members of the task item", "All of support members of the task item", "A portion of support members of the task item". In addition, "A portion of autonomous members of the task item" includes the items of "Autonomous members for communication responsibility" and "Autonomous members for management responsibility". Also, "A portion of support members of the task item" includes the items of "Support members for communication responsibility", "Trainer members for communication responsibility", "Support members for management responsibility", and "Trainer members for management responsibility".

In addition, when the checkbox 770 for the items described above is marked and an item name is clicked, the menu as shown in FIG. 25B is displayed by which whether or not a supervisor or coworker is searched for may be designated. On the menu, items to be selected, "Supervisor of the project", "Coworker of the project", "Supervisor of the functional organization", "Coworker of the functional organization", "Do not designate", are displayed.

In the fourth exemplary embodiment, "Autonomous members for communication responsibility", and "Trainer members for communication responsibility" are designated for the calculation conditions of warning recipients so that the relating persons who match these conditions are obtained by calculation. In addition, for the autonomous members for communication responsibility, it is designated such that supervisors of the project organization and supervisors of the functional organization are searched for. Designated items are displayed with an x mark in the right columns.

FIG. 25C is a diagram showing a data structure of defined warning recipient calculation conditions. The warning recipient calculation condition retaining unit 534 retains warning recipient calculation conditions defined by the warning recipient calculation condition defining unit 532. A warning recipient calculation condition ID, Recipient-Calculation-Conditions-ID-002, is the information for uniquely designating the calculation condition. This is defined as an item having a same name as the schedule information shown in FIG. 3C.

The data that corresponds to each items of FIG. 25A are as follows. For the item "All execution managers of the task item", if the value of the "Activity-Resp-Member:" is defined as TRUE, it indicates that the checkbox for the item is marked, and if the value is defined as FALSE, it indicates that the checkbox is not marked. The items for which the checkbox is marked are displayed as TRUE on the data structure. If the checkbox is not marked, it is displayed as FALSE. This relation between marked or not marked and TRUE or FALSE also holds true for other items. "All autonomous members of the task item" is displayed as "All-Autonomous-Member:". "A portion of autonomous members of the task item" is displayed as "Not-All-Autonomous-Member:". "Autonomous members for communication responsibility" is displayed as "Comm-Resp-Auto-Member:". "Autonomous members for management responsibility" is displayed as "Management-Resp-Auto-Member:". "All support members of the task item" is displayed as "All-Support-Member:". "A portion of support members of the task item" is displayed as "Not-All-Support-Member:". "Support member for communication responsibility" is displayed as "Comm-Resp-Supporter:". "Trainer members for communication responsibility" is displayed as "Comm-Resp-Advisor:". "Support member for management responsibility" is displayed as "Management-Resp-Supporter:". "Trainer members for management responsibility" is displayed as "Management-Resp-Advisor:".

In a case where supervisors or coworkers are to be searched for, "Project-Upper-ManagerProject-Member", "Functional-Organization-Upper-Manager", and "Functional-Organization-Member" are used on the data structure, and in a case where the checkbox is marked and designated to search for them, TRUE or FALSE is added to their values and retained. In this example, it is designated as "Comm-Resp-Auto-Member: TRUE", and after that it is designated with braces as [Project-Upper-Manager: TRUE, Project-Member: FALSE, Functional-Organization-Upper-Manager: TRUE, Functional-Organization-Member: FALSE].

Figure 26:
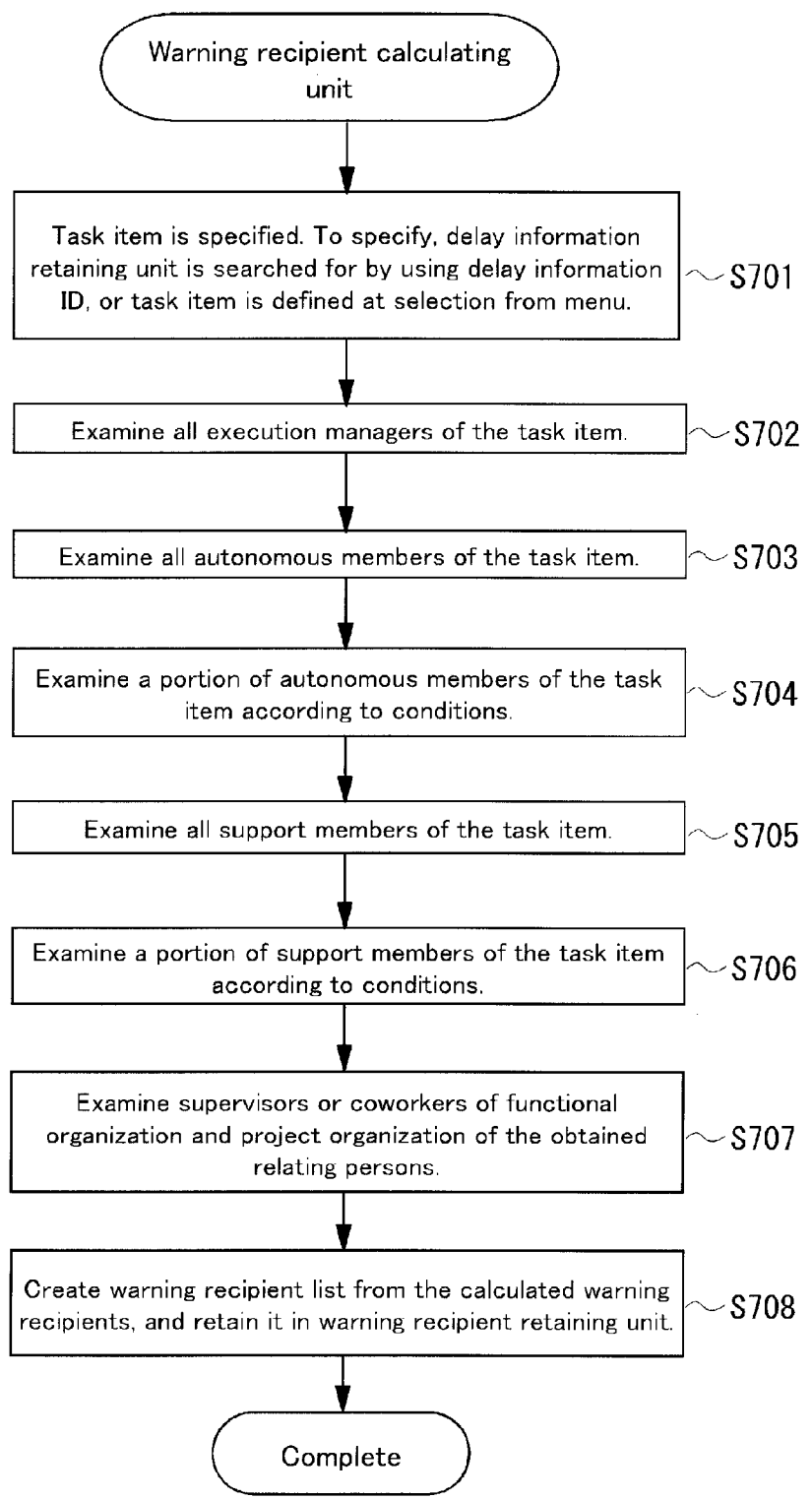
FIG. 26 is a flowchart for illustrating an operation for calculating warning recipients by a warning recipient calculating unit.

Referring now to a flowchart of FIG. 26, an operation for calculating warning recipients by a warning recipient calculating unit is described. The flowchart of the warning recipient calculating unit 530 described in FIG. 26 can be replaced with a specified portion of steps of the warning recipient calculating unit 530 described in the first to third exemplary embodiments. For example, this flowchart corresponds to the steps after S103 of the flowchart shown in FIG. 9, and a specified portion thereof can be replaced. The flowchart of FIG. 9 may be retrieved at the step S208 in the flowchart of the first exemplary embodiment shown in FIG. 12 or at the step S309 in the flowchart of the second exemplary embodiment shown in FIG. 17. In addition, it may be retrieved also at the step S602 of the flowchart of the third exemplary embodiment shown in FIG. 24.

Also, the flowchart corresponds to the steps after S402 of the flowchart of the third exemplary embodiment in FIG. 19A, and a specified portion thereof can be replaced. The warning recipient calculating unit 530 refers to the warning recipient calculation conditions shown in FIG. 25A retained in the warning recipient calculation condition retaining unit 534, the task item responsibility-sharing information and the project organization information that are retained in the relating person data managing unit 600, and calculates warning recipients.

The warning recipient calculating unit 530 specifies a task item at early stage (step S701). In a case where this flowchart is replaced with the flowchart of FIG. 9, the portion to be replaced would be after the step S103 of FIG. 9. In addition, in a case where this flowchart is replaced with the flowchart of FIG. 24A, the portion to be replaced would be after the step S602 of FIG. 24A.

At first, the warning recipient calculating unit 530 examines all of the execution managers of the task item (step S702). It examines whether "Activity-Resp-Member" retained in the warning recipient calculation condition retaining unit 534 is defined as TRUE or FALSE. If it is defined as TRUE, the IDs of the execution managers who correspond to the task item that is specified at the step S701 are searched for from the task item responsibility-sharing information retained in the task item responsibility-sharing information retaining unit 610, and the IDs are retained to a list. If it is defined as FALSE, nothing is done.

Then, the warning recipient calculating unit 530 examines all autonomous members of the task item (step S703). It examines whether "All-Autonomous-Member" that is retained in the warning recipient calculation condition retaining unit 534 is defined as TRUE or FALSE. If it is defined as TRUE, it obtains autonomous members by calculation. The autonomous members are found by collecting all members who are assigned for the task item specified at the step S701 from the task item responsibility-sharing information retained in the task item responsibility-sharing information retaining unit 610, and comparing them with all members of the project that includes the task item, and finding out a same member ID among them. To obtain the members of the project, the project member ID list retained in the project organization information retaining unit 630 may be used. The obtained member IDs are retained in a list. If it is defined as FALSE, nothing is done.

Then, the warning recipient calculating unit 530 examines a portion of the autonomous members of the task item in accordance with the conditions (step S704). It examines whether or not "Comm-Resp-Auto-Member" or "Management-Resp-Auto-Member:", which are retained in the warning recipient calculation condition retaining unit 534, is defined as TRUE. If any one is defined as TRUE, all autonomous members are obtained in a similar way to the processing of the step S702, and among them, autonomous members for communication responsibility or autonomous members for management responsibility, any one that is defined as TRUE, are obtained. The obtained member IDs are retained in a list.

Then, the warning recipient calculating unit 530 examines all support members of the task item (step S705). It examines whether "All-Support-Member" retained in the warning recipient calculation condition retaining unit 534 is defined as TRUE or FALSE. It is defined as TRUE, support members are obtained by calculation. The support members are obtained by collecting all members who are assigned for a specific task item retained in the task item responsibility-sharing information retaining unit 610, and comparing them with all members of the project same as the task item, and finding out a member ID that is not same among them. To obtain the members of the project, the project member ID list retained in the project organization information retaining unit 630 may be used. The obtained member IDs are retained in a list. If it is defined as FALSE, nothing is done.

Then, the warning recipient calculating unit 530 examines a portion of support members of the task item in accordance with the conditions (step S706). It examines whether or not any of "Comm-Resp-Supporter", "Comm-Resp-Advisor", "Management-Resp-Supporter", or "Management-Resp-Advisor", which are retained in the warning recipient calculation condition retaining unit 534, is defined as TRUE. If any one is defined as TRUE, all support members are obtained in a similar way to the processing of the step S704, and among them, support members for communication responsibility, trainers (and trainees) for communication responsibility, or support members for management responsibility, trainers (and trainees) for management responsibility, any one which is defined as TRUE, are obtained. The obtained member IDs are retained in a list.

Then, the warning recipient calculating unit 530 examines supervisors or coworkers of the functional organization and the project organization of the obtained relating persons (step S707). It examines supervisors or coworkers in accordance with a designated condition by checking the content of the list one by one, to find out the functional organization information and the project organization information. Finally, the warning recipient calculating unit 530 obtains logical OR of the warning recipients calculated by the calculation described above, and creates a warning recipient list, and the created warning recipient list is retained in the warning recipient retaining unit 540.

In the fourth exemplary embodiment, the checkboxes of the autonomous members for communication responsibility and the trainer members for communication responsibility in FIG. 25A are marked. In addition, the checkboxes of the supervisor of the project and the supervisor of the functional organization for the autonomous members for communication responsibility are also marked with x. In the warning recipient calculation condition retaining unit 534, the values of "Comm-Resp-Auto-Member" and "Comm-Resp-Advisor" are defined as TRUE. Also, in order to indicate the supervisors of the project and the functional organization to which "Comm-Resp-Auto-Member" belongs, the values of "Project-Upper-Manager" and "Functional-Organization-Upper-Manager" are defined as TRUE. In the warning recipient calculating unit 530, the member ID that corresponds to "Resp-Auto-Member" is searched for from the task item responsibility-sharing information and the project organization information. In this example, only Mm101 who holds the responsibility of accountability for the task item, Design A, is found out. Then, the supervisors of the project and the functional organization to which Mm101 belongs are searched for from the project organization information and the functional organization information. GM001 and PM001 are found, respectively. The communication managers are Mm101, Mm106, and PM001; and Mm106 and PM001 are "Comm-Resp-Supporter". Desired "Comm-Resp-Advisor" is not found out. Therefore, the member IDs retained in the warning recipient retaining unit 540 are Mm101, GM001, and PM001.

The exemplary embodiments described above have been provided for the purposes of illustration, and are not intended to limit the scope of the invention. It should be understood that the invention may be implemented by other methods within the scope of the invention that satisfies requirements of a configuration of the present invention.

A schedule warning system and a medium storing a schedule warning program according to an aspect of the present invention may be used between electronic devices connected to a network such as a computer or the like.

What is claimed is:

1. A schedule warning system comprising:
    a schedule information retaining unit that stores schedule information for a task plan, the task plan comprising at least one task item and the schedule information comprising actual performance information for the at least one task item,
    a schedule managing unit that manages the schedule information that is stored in the schedule information retaining unit,
    a relating person data managing unit that manages relating person data that relates to the schedule information,
    a defining unit that defines, for each task item, a delay monitoring condition that includes one or more criterion used to determine whether a delay occurs for the task item, and defines, for each task item, a warning recipient calculation condition that includes a range of warning recipients to be warned if a delay occurs,
    a delay monitoring unit that periodically monitors the schedule information that is stored in the schedule information retaining unit and repeatedly detects whether a schedule delay occurs in the task plan, based on the one or more criterion for the at least one task item of the task plan and the actual performance information for the at least one task item of the task plan,
    a warning recipient calculating unit that, when a delay occurs, identifies a relating person who corresponds to the task item from the relating person data based on the warning recipient calculation condition and calculates at least one warning recipient, and
    a warning execution unit that transmits a warning to the at least one warning recipient,
    wherein transmitting the warning message comprises first sending a warning confirmation request to the relating person to confirm that the warning message should be sent, and only sending the warning message to the at least one warning recipient if a warning confirmation response is received in response to the warning confirmation request.

2. The schedule warning system according to claim 1, wherein the relating person data comprises task item responsibility-sharing information regarding a task item in which the relating person participates, and either organization information of an organization to which the relating person belongs or organization information to which a project belongs.

3. The schedule warning system according to claim 2, the warning recipient calculating unit identifies a relating person from the task item responsibility-sharing information in accordance with the warning recipient calculation condition, and identifies a relating person from the organization information to which the identified relating person belongs.

4. The schedule warning system according to claim 1, the warning recipient calculating unit creates a warning recipient list based on the identified relating person.

5. The schedule warning system according to claim 4, the schedule warning system further comprises a warning pre-transmission confirmation unit that determines whether or not a confirmation of the warning recipient list is required before transmitting a warning.

6. The schedule warning system according to claim 5, the schedule warning system further comprises a warning pre-transmission confirmation defining unit that adds information about whether or not a warning is to be transmitted to each of the warning recipients in the warning recipient list.

7. The schedule warning system according to claim 4, the schedule warning system further comprising:
    a warning recipient advance information use defining unit that defines whether or not the warning recipient advance information is to be used, and retains the definition as a warning recipient advance information use definition,
    a warning recipient control information defining unit that selects at least one of control information from immediately transmit, hold transmission, or specify transmission date, based on the warning recipient advance information use definition, and adds the selection to each of the warning recipients in the warning recipient list.

8. The schedule warning system according to claim 1, when a delay for each task items of the schedule information is detected, the delay monitoring unit provides delay information for each task items to the warning recipient calculating unit.

9. The schedule warning system according to claim 1, the schedule warning system further comprises a warning recipient advance information creating unit that defines whether or not warning recipient advance information is to be defined, before monitoring a schedule delay.

10. The schedule warning system according to claim 1, the schedule warning system further comprises a warning history managing unit that stores history information that includes at least a warning recipient and a warning message regarding a transmitted warning.

11. The schedule warning system according to claim 1, wherein the delay monitoring unit detects a delay by comparing a task plan of the task item with an actual task performance of the task item.

12. A schedule warning method for transmitting a warning based on schedule information for at least one task item, the method comprising:
   storing schedule information for a task plan, the task plan comprising at least one task item and the schedule information comprising actual performance information for the at least one task item,
   defining, for each task item, a delay monitoring condition that includes one or more criterion used to determine whether a delay occurs for the task item, and a warning recipient calculation condition that includes a range of warning recipients to be warned if a delay occurs,
   periodically monitoring the stored schedule information and repeatedly detecting whether a schedule delay occurs in the task plan, based on the one or more criterion for the at least one task item of the task plan and the actual performance information for the at least one task item of the task plan,
   when a schedule delay occurs, calculating at least one warning recipient by identifying a relating person who corresponds to the task item from a storing medium that stores relating person data, based on the warning recipient calculation condition, and
   transmitting a warning to the at least one warning recipient, wherein transmitting the warning comprises first sending a warning confirmation request to the relating person to confirm that the warning message should be sent, and only sending the warning message to the at least one warning recipient if a warning confirmation response is received in response to the warning confirmation request.

13. A computer readable medium storing a schedule warning program causing a computer to execute a process for transmitting a warning based on schedule information for at least one task item, the process comprising:
   storing schedule information for a task plan, the task plan comprising at least one task item and the schedule information comprising actual performance information for the at least one task item,
   defining, for each task item, a delay monitoring condition that includes one or more criterion used to determine whether a delay occurs for the task item, and a warning recipient calculation condition that includes a range of warning recipients to be warned if a delay occurs,
   periodically monitoring the stored schedule information and repeatedly detecting whether a schedule delay occurs in the task plan, based on the one or more criterion for the at least one task item of the task plan and the actual performance information for the at least one task item of the task plan,
   when a schedule delay occurs, calculating at least one warning recipient by identifying a relating person who corresponds to the task item from a storing medium that stores relating person data, based on the warning recipient calculation condition, and
   transmitting a warning to the at least one warning recipient, wherein transmitting the warning message comprises first sending a warning confirmation request to the relating person to confirm that the warning message should be sent, and only sending the warning message to the at least one warning recipient if a warning confirmation response is received in response to the warning confirmation request.

14. The computer readable medium storing schedule warning program according to claim 13, the calculation of the warning recipient further identifies a relating person from task item responsibility-sharing information in accordance with the warning recipient calculation condition, and identifies a relating person from organization information of an organization to which the identified relating person belongs.

15. The computer readable medium storing schedule warning program according to claim 13, the calculation of the warning recipient creates a warning recipient list based on the identified relating person.

16. The computer readable medium storing schedule warning program according to claim 15, the computer readable medium storing schedule warning program further comprises adding information whether or not a warning is to be transmitted to each of the warning recipient in the warning recipient list, after calculating the warning recipient and before transmitting a warning.

17. The computer readable medium storing schedule warning program according to claim 15, the computer readable medium storing schedule warning program further comprises selecting at least one of control information from immediately transmit, hold transmission, or specify transmission date, and adding the selection to each of the warning recipient in the warning recipient list, after calculating the warning recipient and before transmitting a warning.

18. The computer readable medium storing schedule warning program according to claim 13, when a delay for each task item of the schedule information is detected, the monitoring provides delay information for each task item to the calculation of warning recipient.

19. The computer readable medium storing schedule warning program according to claim 13, the computer readable medium storing schedule warning program further comprises managing a warning history, and storing at least a warning recipient and a warning message regarding a transmitted warning to manage the warning history.

20. A schedule warning system comprising:
   a schedule managing unit that manages a schedule including at least one task item;
   a relating person data managing unit that manages relating person data that, for each person of a plurality of people, designates functional organization information indicating coworkers and supervisors of the person, and project management information associated with the person, and, for each task item, designates one or more persons of the plurality of people as a related person assigned to the task item;
   a delay monitoring condition defining unit that defines, for each task item, a delay monitoring condition that includes one or more criterion used to determine whether a delay occurs for the task item and a time at which to provide a notice of the delay for the task item;
   a warning recipient calculation condition defining unit that defines, for each task item, a warning recipient calculation condition that indicates a range of people to be warned if a delay occurs, the range of people being all related persons assigned to a task item, a designated portion of the related persons assigned to the task item, all coworkers and supervisors of the related person assigned to the task item, or a designated portion of the coworkers and supervisors of the related person assigned to the task item;

a delay monitoring unit that monitors whether a delay occurs in a task item, based on the time and the one or more criterion for the task item;

a warning recipient calculating unit that, when a delay occurs in a task item, identifies one or more related persons assigned to the task item based on the relating person data, and generates a warning recipient list of warning recipients including the identified one or more related persons and at least one additional warning recipient based on the relating person data and the warning recipient calculation condition; and a warning execution unit that transmits a warning message to the warning recipients in the warning recipient list, wherein transmitting the warning message comprises first sending a warning confirmation request to the identified one or more related persons in the warning recipient list to confirm that the warning message should be sent, and only sending the warning message to the at least one additional warning recipient if a warning confirmation response is received in response to the warning confirmation request.

21. The schedule warning system according to claim 20, wherein the delay monitoring unit detects whether a delay occurs by comparing a task plan of the task item with an actual task performance of the task item.

\* \* \* \* \*